US008032605B2

(12) United States Patent
Brown et al.

(10) Patent No.: US 8,032,605 B2
(45) Date of Patent: *Oct. 4, 2011

(54) GENERATION AND DISTRIBUTION OF MOTION COMMANDS OVER A DISTRIBUTED NETWORK

(75) Inventors: David W. Brown, Bingen, WA (US); Jay S. Clark, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 1158 days.

This patent is subject to a terminal disclaimer.

(21) Appl. No.: 10/405,883

(22) Filed: Apr. 1, 2003

(65) Prior Publication Data

US 2010/0131104 A1    May 27, 2010

Related U.S. Application Data

(63) Continuation of application No. 09/790,401, filed on Feb. 21, 2001, now Pat. No. 6,542,925, and a continuation-in-part of application No. 09/699,132, filed on Oct. 27, 2000, now Pat. No. 6,480,896.

(60) Provisional application No. 60/185,557, filed on Feb. 28, 2000, provisional application No. 60/185,192, filed on Feb. 25, 2000, provisional application No. 60/184,067, filed on Feb. 22, 2000, provisional application No. 60/182,864, filed on Feb. 16, 2000, provisional application No. 60/162,989, filed on Nov. 1, 1999, provisional application No. 60/162,802, filed on Nov. 1, 1999, provisional application No. 60/162,801, filed on Nov. 1, 1999, provisional application No. 60/161,901, filed on Oct. 27, 1999.

(51) Int. Cl.
*G06F 15/16* (2006.01)

(52) U.S. Cl. ............ 709/208; 709/203; 709/220; 700/1; 700/2; 700/18; 700/56; 700/57; 700/58; 700/61; 700/62; 700/63; 700/64; 700/65; 700/66; 700/86; 700/245; 700/246; 700/247; 700/248; 700/249; 700/260; 700/261; 700/262; 700/263; 700/264

(58) Field of Classification Search .................. 709/208, 709/203, 209, 220; 700/1, 2, 18, 56–58, 700/61–66, 86, 245–249, 260–264

See application file for complete search history.

(56) References Cited

U.S. PATENT DOCUMENTS 4,159,417 A    6/1979    Rubincam
(Continued)

FOREIGN PATENT DOCUMENTS

EP    0442676 A2    8/1991
(Continued)

OTHER PUBLICATIONS

WOSA Backgrounder: Delivering Enterprise Services to the Windows-based Desktop, Jul. 1993, Microsoft Development Library; pp. 1-19.

(Continued)

*Primary Examiner* — Dohm Chankong
(74) *Attorney, Agent, or Firm* — Michael R. Schacht; Schacht Law Office, Inc.

(57) ABSTRACT

A method of causing movement of at least one target device based on at least one of a plurality of motion programs stored on a content server connected to a network. At least one identified characteristic of the at least one target device is identified. At least one selected motion program is selected from the plurality of motion programs stored on the content server. The at least one identified characteristic and the at least one selected motion program are transferred to the motion server. A motion media data set is generated at the motion server for the target motion device based on the at least one identified characteristic of the target device and the at least one selected motion program. The motion media data set is transferred from the motion server to the target motion device to cause the target device to perform the desired sequence of movements.

3 Claims, 11 Drawing Sheets

U.S. PATENT DOCUMENTS

| | | | |
|---|---|---|---|
| 4,199,814 A | 4/1980 | Rapp et al. | |
| 4,418,381 A | 11/1983 | Molusis et al. | |
| 4,422,150 A | 12/1983 | Keller et al. | |
| 4,494,060 A | 1/1985 | Chitayat et al. | |
| 4,531,182 A | 7/1985 | Hyatt | |
| 4,688,195 A | 8/1987 | Thompson et al. | |
| 4,713,808 A | 12/1987 | Gaskill | |
| 4,716,458 A | 12/1987 | Heitzman et al. | |
| 4,750,888 A | 6/1988 | Allard et al. | |
| 4,767,334 A | 8/1988 | Thorne et al. | |
| 4,769,771 A | 9/1988 | Lippmann et al. | |
| 4,782,444 A | 11/1988 | Munshi et al. | |
| 4,800,521 A | 1/1989 | Carter et al. | |
| 4,809,335 A | 2/1989 | Rumsy | |
| 4,815,011 A | 3/1989 | Mizuno et al. | |
| 4,829,419 A | 5/1989 | Hyatt | |
| 4,840,602 A | 6/1989 | Rose | |
| 4,846,693 A | 7/1989 | Baer | |
| 4,852,047 A | 7/1989 | Lavallee et al. | |
| 4,855,725 A | 8/1989 | Fernandez | |
| 4,857,030 A | 8/1989 | Rose | |
| 4,887,966 A | 12/1989 | Gellerman | |
| 4,897,835 A | 1/1990 | Gaskill | |
| 4,901,218 A * | 2/1990 | Cornwell | 700/2 |
| 4,912,650 A | 3/1990 | Tanaka et al. | |
| 4,923,428 A | 5/1990 | Curran | |
| 4,937,737 A | 6/1990 | Schwane et al. | |
| 4,987,537 A | 1/1991 | Kawata | |
| 5,005,134 A | 4/1991 | Nakashima et al. | |
| 5,005,135 A | 4/1991 | Morser et al. | |
| 5,014,208 A * | 5/1991 | Wolfson | 700/99 |
| 5,020,021 A | 5/1991 | Kaji et al. | |
| 5,095,445 A | 3/1992 | Sekiguchi | |
| 5,120,065 A | 6/1992 | Driscoll et al. | |
| 5,126,932 A | 6/1992 | Wolfson et al. | |
| 5,168,441 A | 12/1992 | Onarheim et al. | |
| 5,175,684 A | 12/1992 | Chong | |
| 5,175,817 A | 12/1992 | Adams et al. | |
| 5,175,856 A | 12/1992 | Van Dyke et al. | |
| 5,204,599 A | 4/1993 | Hohn | |
| 5,230,049 A | 7/1993 | Chang et al. | |
| 5,231,693 A | 7/1993 | Backes et al. | |
| 5,245,703 A | 9/1993 | Hubert | |
| 5,247,650 A | 9/1993 | Judd et al. | |
| 5,291,416 A | 3/1994 | Hutchins | |
| 5,368,484 A | 11/1994 | Copperman et al. | |
| 5,377,258 A | 12/1994 | Bro | |
| 5,382,026 A | 1/1995 | Harvard et al. | |
| 5,390,304 A | 2/1995 | Leach et al. | |
| 5,390,330 A | 2/1995 | Talati | |
| 5,392,207 A | 2/1995 | Wilson et al. | |
| 5,392,382 A | 2/1995 | Schoppers | |
| 5,400,345 A | 3/1995 | Ryan, Jr. | |
| 5,402,518 A | 3/1995 | Lowery | |
| 5,405,152 A | 4/1995 | Katanics et al. | |
| 5,412,757 A | 5/1995 | Endo | |
| 5,413,355 A | 5/1995 | Gonzalez | |
| 5,418,964 A | 5/1995 | Conner et al. | |
| 5,438,529 A | 8/1995 | Rosenberg et al. | |
| 5,450,079 A | 9/1995 | Dunaway | |
| 5,453,933 A | 9/1995 | Wright et al. | |
| 5,459,382 A | 10/1995 | Jacobus et al. | |
| 5,465,215 A | 11/1995 | Strickland et al. | |
| 5,483,440 A | 1/1996 | Aono et al. | |
| 5,485,545 A | 1/1996 | Kojima et al. | |
| 5,485,620 A | 1/1996 | Sadre et al. | |
| 5,491,813 A | 2/1996 | Bondy et al. | |
| 5,493,281 A | 2/1996 | Owens | |
| 5,511,147 A | 4/1996 | Abdel-Malek | |
| 5,541,838 A | 7/1996 | Koyama et al. | |
| 5,576,727 A | 11/1996 | Rosenberg et al. | |
| 5,577,253 A | 11/1996 | Blickstein | |
| 5,596,994 A | 1/1997 | Bro | |
| 5,600,373 A | 2/1997 | Chui et al. | |
| 5,604,843 A | 2/1997 | Shaw et al. | |
| 5,607,336 A | 3/1997 | Lebensfeld et al. | |
| 5,608,894 A | 3/1997 | Kawakami et al. | |
| 5,613,117 A | 3/1997 | Davidson et al. | |
| 5,617,528 A | 4/1997 | Stechmann et al. | |
| 5,618,179 A | 4/1997 | Copperman et al. | |
| 5,623,582 A | 4/1997 | Rosenberg | |
| 5,625,820 A | 4/1997 | Hermsmeier et al. | |
| 5,625,821 A | 4/1997 | Record et al. | |
| 5,636,994 A | 6/1997 | Tong | |
| 5,652,866 A | 7/1997 | Aldred et al. | |
| 5,655,945 A | 8/1997 | Jani | |
| 5,659,753 A | 8/1997 | Murphy et al. | |
| 5,666,161 A | 9/1997 | Kohiyama et al. | |
| 5,666,264 A | 9/1997 | Chandler et al. | |
| 5,670,992 A | 9/1997 | Yasuhara et al. | |
| 5,691,897 A | 11/1997 | Brown et al. | |
| 5,691,898 A | 11/1997 | Rosenberg et al. | |
| 5,692,195 A | 11/1997 | Conner et al. | |
| 5,701,140 A | 12/1997 | Rosenberg et al. | |
| 5,704,837 A | 1/1998 | Iwasaki et al. | |
| 5,707,289 A | 1/1998 | Watanabe et al. | |
| 5,724,074 A | 3/1998 | Chainani et al. | |
| 5,733,131 A | 3/1998 | Park | |
| 5,734,373 A | 3/1998 | Rosenberg et al. | |
| 5,737,523 A | 4/1998 | Callaghan et al. | |
| 5,739,811 A | 4/1998 | Rosenberg et al. | |
| 5,746,602 A | 5/1998 | Kikinis | |
| 5,752,880 A | 5/1998 | Gabai et al. | |
| 5,754,855 A | 5/1998 | Miller et al. | |
| 5,764,155 A | 6/1998 | Kertesz et al. | |
| 5,766,077 A | 6/1998 | Hongo | |
| 5,772,504 A | 6/1998 | Machiguchi | |
| 5,790,178 A | 8/1998 | Shibata et al. | |
| 5,800,268 A | 9/1998 | Molnick | |
| 5,801,946 A | 9/1998 | Nissen et al. | |
| 5,802,365 A | 9/1998 | Kathail et al. | |
| 5,805,785 A | 9/1998 | Dias et al. | |
| 5,818,537 A | 10/1998 | Enokida et al. | |
| 5,821,920 A | 10/1998 | Rosenberg et al. | |
| 5,821,987 A | 10/1998 | Larson | |
| 5,822,207 A | 10/1998 | Hazama et al. | |
| 5,825,308 A | 10/1998 | Rosenberg | |
| 5,828,575 A | 10/1998 | Sakai | |
| 5,832,189 A | 11/1998 | Tow | |
| 5,836,014 A | 11/1998 | Faiman, Jr. | |
| 5,846,132 A | 12/1998 | Junkin | |
| 5,848,415 A | 12/1998 | Guck | |
| 5,852,441 A | 12/1998 | Nakajima et al. | |
| 5,855,483 A | 1/1999 | Collins et al. | |
| 5,867,385 A | 2/1999 | Brown et al. | |
| 5,873,765 A | 2/1999 | Rifkin et al. | |
| 5,889,670 A | 3/1999 | Schuler et al. | |
| 5,889,672 A | 3/1999 | Schuler et al. | |
| 5,889,924 A | 3/1999 | Okabayashi et al. | |
| 5,890,963 A | 4/1999 | Yen | |
| 5,907,704 A | 5/1999 | Gudmundson et al. | |
| 5,907,831 A | 5/1999 | Lotvin et al. | |
| 5,914,876 A | 6/1999 | Hirai | |
| 5,920,476 A | 7/1999 | Hennessey et al. | |
| 5,921,780 A | 7/1999 | Myers | |
| 5,924,013 A | 7/1999 | Guido et al. | |
| 5,956,484 A | 9/1999 | Rosenberg et al. | |
| 5,959,613 A | 9/1999 | Rosenberg et al. | |
| 5,960,085 A | 9/1999 | De La Huerga | |
| 5,977,951 A | 11/1999 | Danieli et al. | |
| 5,984,499 A | 11/1999 | Nourse et al. | |
| 5,991,528 A * | 11/1999 | Taylor et al. | 703/6 |
| 6,012,961 A | 1/2000 | Sharpe et al. | |
| 6,020,876 A | 2/2000 | Rosenberg et al. | |
| 6,028,593 A | 2/2000 | Rosenberg et al. | |
| 6,031,973 A | 2/2000 | Gomi et al. | |
| 6,038,493 A | 3/2000 | Tow | |
| 6,038,603 A | 3/2000 | Joseph | |
| 6,046,727 A | 4/2000 | Rosenberg et al. | |
| 6,057,828 A | 5/2000 | Rosenberg et al. | |
| 6,061,004 A | 5/2000 | Rosenberg | |
| 6,065,365 A | 5/2000 | Ostler et al. | |
| 6,070,010 A | 5/2000 | Keenleyside et al. | |
| 6,078,308 A | 6/2000 | Rosenberg et al. | |
| 6,078,747 A | 6/2000 | Jewitt | |
| 6,078,968 A | 6/2000 | Lo et al. | |
| 6,080,063 A | 6/2000 | Khosla | |

| | | | |
|---|---|---|---|
| 6,083,104 A | 7/2000 | Choi | |
| 6,090,156 A | 7/2000 | MacLeod | |
| 6,100,874 A | 8/2000 | Schena et al. | |
| 6,101,425 A * | 8/2000 | Govindaraj et al. | 700/181 |
| 6,101,530 A | 8/2000 | Rosenberg et al. | |
| 6,104,158 A | 8/2000 | Jacobus et al. | |
| 6,125,385 A | 9/2000 | Wies et al. | |
| 6,128,006 A | 10/2000 | Rosenberg et al. | |
| 6,131,097 A | 10/2000 | Peurach et al. | |
| 6,133,867 A | 10/2000 | Eberwine et al. | |
| 6,139,177 A | 10/2000 | Venkatraman et al. | |
| 6,144,895 A | 11/2000 | Govindaraj et al. | |
| 6,147,647 A | 11/2000 | Tassoudji et al. | |
| 6,161,126 A | 12/2000 | Wies et al. | |
| 6,166,723 A | 12/2000 | Schena et al. | |
| 6,169,540 B1 | 1/2001 | Rosenberg et al. | |
| 6,173,316 B1 | 1/2001 | De Boor et al. | |
| 6,191,774 B1 | 2/2001 | Schena et al. | |
| 6,195,592 B1 | 2/2001 | Schuler et al. | |
| 6,201,996 B1 * | 3/2001 | Crater et al. | 700/9 |
| 6,209,037 B1 | 3/2001 | Brown et al. | |
| 6,216,173 B1 | 4/2001 | Jones et al. | |
| 6,219,032 B1 | 4/2001 | Rosenberg et al. | |
| 6,219,033 B1 | 4/2001 | Rosenberg et al. | |
| 6,232,891 B1 | 5/2001 | Rosenberg | |
| 6,233,545 B1 | 5/2001 | Datig | |
| 6,242,880 B1 | 6/2001 | Hong | |
| 6,243,078 B1 | 6/2001 | Rosenberg | |
| 6,246,390 B1 | 6/2001 | Rosenberg | |
| 6,247,994 B1 | 6/2001 | DeAngelis et al. | |
| 6,252,579 B1 | 6/2001 | Rosenberg et al. | |
| 6,252,853 B1 | 6/2001 | Ohno | |
| 6,259,382 B1 | 7/2001 | Rosenberg | |
| 6,271,833 B1 | 8/2001 | Rosenberg et al. | |
| 6,278,439 B1 | 8/2001 | Rosenberg et al. | |
| 6,285,351 B1 | 9/2001 | Chang et al. | |
| 6,286,133 B1 | 9/2001 | Hopkins | |
| 6,288,705 B1 | 9/2001 | Rosenberg et al. | |
| 6,288,716 B1 | 9/2001 | Humpleman et al. | |
| 6,290,565 B1 | 9/2001 | Galyean, III et al. | |
| 6,290,566 B1 * | 9/2001 | Gabai et al. | 446/175 |
| 6,292,170 B1 | 9/2001 | Chang et al. | |
| 6,292,174 B1 | 9/2001 | Mallett et al. | |
| 6,292,712 B1 | 9/2001 | Bullen | |
| 6,292,714 B1 | 9/2001 | Okabayashi | |
| 6,295,530 B1 | 9/2001 | Ritchie et al. | |
| 6,300,936 B1 | 10/2001 | Braun et al. | |
| 6,300,937 B1 | 10/2001 | Rosenberg | |
| 6,301,634 B1 | 10/2001 | Gomi et al. | |
| 6,304,091 B1 | 10/2001 | Shahoian et al. | |
| 6,305,011 B1 | 10/2001 | Safonov | |
| 6,309,275 B1 | 10/2001 | Fong et al. | |
| 6,310,605 B1 | 10/2001 | Rosenberg et al. | |
| 6,317,116 B1 | 11/2001 | Rosenberg et al. | |
| 6,317,871 B1 | 11/2001 | Andrews et al. | |
| 6,319,010 B1 | 11/2001 | Kikinis | |
| 6,343,349 B1 | 1/2002 | Braun et al. | |
| 6,345,212 B1 | 2/2002 | Nourse | |
| 6,353,850 B1 | 3/2002 | Wies et al. | |
| 6,366,272 B1 | 4/2002 | Rosenberg et al. | |
| 6,366,273 B1 | 4/2002 | Rosenberg et al. | |
| 6,366,293 B1 | 4/2002 | Hamilton et al. | |
| 6,374,195 B1 | 4/2002 | Li et al. | |
| 6,374,255 B1 | 4/2002 | Peurach et al. | |
| 6,400,996 B1 | 6/2002 | Hoffberg et al. | |
| 6,401,005 B1 | 6/2002 | Schwarz et al. | |
| 6,425,118 B1 | 7/2002 | Molloy et al. | |
| 6,430,471 B1 * | 8/2002 | Kintou et al. | 700/245 |
| 6,439,956 B1 | 8/2002 | Ho | |
| 6,442,451 B1 | 8/2002 | Lapham | |
| 6,463,404 B1 | 10/2002 | Appleby | |
| 6,470,377 B1 | 10/2002 | Sevcik et al. | |
| 6,473,824 B1 | 10/2002 | Kreissig et al. | |
| 6,480,896 B1 | 11/2002 | Brown et al. | |
| 6,518,980 B1 | 2/2003 | DeMotte et al. | |
| 6,519,594 B1 | 2/2003 | Li | |
| 6,519,646 B1 | 2/2003 | Gupta et al. | |
| 6,523,171 B1 | 2/2003 | Dupuy et al. | |
| 6,546,436 B1 | 4/2003 | Fainmesser et al. | |
| 6,559,860 B1 | 5/2003 | Hamilton et al. | |
| 6,571,141 B1 | 5/2003 | Brown | |
| 6,606,665 B2 | 8/2003 | Govindaraj et al. | |
| 6,615,091 B1 | 9/2003 | Birchenough et al. | |
| 6,647,328 B2 * | 11/2003 | Walker | 701/36 |
| 6,652,378 B2 | 11/2003 | Cannon et al. | |
| 6,658,627 B1 | 12/2003 | Gallup et al. | |
| 6,662,361 B1 | 12/2003 | Jackson | |
| 6,665,688 B1 | 12/2003 | Callahan, II et al. | |
| 6,668,211 B1 | 12/2003 | Fujita et al. | |
| 6,678,713 B1 | 1/2004 | Mason et al. | |
| 6,778,949 B2 | 8/2004 | Duan et al. | |
| 6,848,107 B1 | 1/2005 | Komine et al. | |
| 6,941,543 B1 | 9/2005 | Brown et al. | |
| 6,944,584 B1 * | 9/2005 | Tenney et al. | 703/22 |
| 2001/0029443 A1 | 10/2001 | Miyahira | |
| 2001/0037492 A1 | 11/2001 | Holzmann | |
| 2002/0177453 A1 | 11/2002 | Chen et al. | |
| 2003/0069998 A1 | 4/2003 | Brown et al. | |

FOREIGN PATENT DOCUMENTS

| | | |
|---|---|---|
| EP | 0 281 427 B1 | 8/1992 |
| EP | 0508912 A1 | 10/1992 |
| EP | 0 583 908 A2 | 2/1994 |
| EP | 1 260 891 A1 | 5/1995 |
| EP | 821522 A2 | 1/1998 |
| EP | 0275826 A1 | 7/1998 |
| EP | 1 174 779 A1 | 4/2000 |
| GB | 2 224 896 A | 12/1991 |
| JP | 59 228473 | 6/1983 |
| JP | 8161335 A | 6/1996 |
| JP | 2000020114 A | 1/2000 |
| WO | WO 92/11731 | 7/1992 |
| WO | WO 93/08654 | 4/1993 |
| WO | WO 95/07504 | 3/1995 |

OTHER PUBLICATIONS

WOSA Inside Windows 95; pp. 348-351.
Software Products for Industrial Automation, Iconics, Inc.; 1993; 6 pages.
Web 3.0 Product Brochure, Trihedral Engineering Ltd. (1994); 6 pages.
The Complete, Computer-Based Automation Tool (IGSS) Seven Technologies A/S; 6 pages, 1993.
Oregon Micro Systems, Inc.; Precision Motion Controls Product Guide: pp. 1-20, 1994.
Aimax-Win Product Brochure, TA Engineering Co., Inc.; 1993; 8 pages.
Xanalog Model NL-SIM Product Brochure, Xanalog, 1994; 4 pages.
ExperTune PID Tuning Software, Gerry Engineering Software; 1993; 6 pages.
PMAC Product Catalog, 1992; p. 43.
Paragon TNT Product Brochure, Intec Controls Corps.; 6 pages, 1995.
Aerotech Motion Control Product Guide; pp. 233-234, 1994.
OpenBatch Product Brief, PID, Inc.; 1994; 6 pages.
PC/DSP-Series Motion Controller C Programming Guide; 1992; pp. 1-54.
FIX Product Brochure, Intellution (1994); 6 pages.
Compumotor Digiplan (1993-94) Catalog pp. 10-11.
Sue Chen Jonathon Lin; *Computer Numerical Control: Essentials in Programming and Networking*; Part V, Chapter 27; 1994; pp. 824-848; Delmar Publishers, Inc.; U.S.
Pritschow et al.; "Open System Controllers: Challenge for the Future of the Machine Tool Industry"; pub. Jan. 15, 1993; pp. 449-452.
William E. Ford; "What Is an Open Architecture Robot Controller" pub. Aug. 16, 1994; pp. 27-32.
Marcos et al.; "A New Solution for Integrating Control Devices Involved in Computer-Integrated Manufacturing"; pub. Sep. 2, 1996; pp. 485-490.
Chu and Wang; "Development of a Practical SFC System for CNC Machine Shop"; pub. 1994; pp. 362-367.
Microsoft; "The Microsoft Object Technology Strategy"; pub. Mar. 1994; pp. 1-33.

Microsoft; "Open Systems: Technology, Leadership, and Collaboration"; pub. Mar. 1994; pp. 1-15.
Microsoft; Microsoft OLE Today and Tomorrow: Technology Overview; pub. Dec. 1993; pp. 1-9.
Microsoft; "Object Linking and Embedding 2.0 Backgrounder"; pub. Sep. 1993; pp. 1-15.
Robert Anderson; "SMART: A Modular Architecture for Robotics and Teleoperation"; pub. 1993; pp. 416-421.
Proctor et al.; "Validation of Standard Interfaces for Machine Control"; pub. 1996; pp. 659-664.
Altintas et al.; "Design and Analysis of a Modular CNC System"; pub. Mar. 4, 1990; pp. 305-316.
Wright et al.; "Open Architecture Manufacturing: The Impact of Open-System Computers on Self-sustaining Machinery and the Machine Tool Industry"; pp. 41-47, 1990.
Protoctor et al.; "Open Architecture Controllers"; pub. Jun. 1997; pp. 60-64.
Lutz et al.; "Osaca-The Vendor-Neutral Control Architecture"; pub. Dec. 1997; pp. 247-256.
Morales et al.; "A Generalised Software Control System for Industrial Robots"; pub. 1998; pp. 411-416.
Feng et al.; "Distributed Control of a Multiple-Tethered Mobile Robot System for Highway Maintenance and Construction"; pub Nov. 1997; pp. 383-392.
Fedrowitz; IRL-Based Expansion of the Commonly Used High-Level Language C for Robot Programming: pub. Oct. 1995; 5 pages.
Szabo et al.; "Validation Results of Specifications for Motion Control Interoperability"; pub. Sep. 1997; pp. 166-176.
Chang et al.; "Development and Implementation of an Application Programming Interface for PC/DSP-based Motion Control System"; pub. 1998; pp. 94-105.
Erol et al.; "Open System Architecture Modular Tool Kit for Motion and Machine Control"; pub. Sep. 2000; pp. 281-291.
Mizukawa et al.; "OriN: Open Robot Interface for the Network: A Proposed Standard"; pub. May 2000; pp. 344-350.
Michaloski et al.; "A Framework for Component-base CNC Machines" pub. Nov. 1998; pp. 132-143.
Bouzouia et al.; "A Three-layer Workcell Control Architecture Design"; pub. May 1998; pp. 1185-1191.
Morales et al.; "Generis: The EC-JRC Generalized Software Control System for Industrial Robots"; pub. 1999; pp. 26-33.
Muir et al.; "Mechatronic Objects for Real-time Control Software Development"; pub. Nov. 1998; pp. 251-265.
Cho et al.; "A Compact/Open Network-based Controller Incorporating Modular Software Architecture for a Humanoid Robot"; pub. 1999; pp. 341-355.
Ge et al.; "A One-stop Solution in Robotic Control System Design"; pub. Sep. 2000; pp. 42-55.
McGraw et al.; "A Friendly Command, Control, and Information System for Astronomy"; pub. 1996; pp. 356-367.
Jackman; "Robotic Control Using Sequential Function Charts"; pub. 1996; pp. 120-128.
Mizukawa et al.; "De-facto Standard API for Open and Networked Industrial Robots"; pub. Oct. 1999; pp. 455-462.
Leu et al.; "A Telemanufacturing Workcell over the Internet"; pub. Nov. 1998; pp. 230-237.
Natale et al.; "Robust Hybrid Force/Position Control with Experiments on an Industrial Robot"; pub. Sep. 19, 1999; pp. 956-961.
Nilsson et al.; "Integrated Architecture for Industrial Robot Programming and Control"; pub. Dec. 31, 1999; pp. 205-226.
Valera et al.; "Interactive Online Evaluation of Robot Motion Control"; pub. Aug. 22, 1999; pp. 1039-1043.
"NEMI Low-cost Controller Project"; pub. Dec. 1996; total pp. 392.
Sperling; "Designing Applications for an OSACA Control"; pub. Nov. 16, 1997; 5 pages.
Sperling et al.; "Enabling Open Control Systems: An Introduction to the OSACA System Platform"; pub. May 1996; pp. 1-8.
OMAC Requirements Document; "Requirements of Open Modular Architecture Controllers for Applications in the Automotive Industry"; pub. Dec. 13, 1994; pp. 1-13.
GM Powertrain Group Manufacturing Engineering Controls Council; "Open, Modular Architecture Controls at GM Powertrain"; pub. May 14. 1996; pp. 1-33.

Team ICLP API Working Group; "Technologies Enabling Agile Manufacturing (TEAM) Intelligent Closed Loop Processing"; pub. Jan. 11, 1996; 30 pages.
Bradley Bargen and Peter Donnely; *Inside Direct X—In Depth Techniques for Developing High-Performance Multimedia Applications*; 1988; Chps. 1, 18-20, 22-27; Microsoft Press; U.S.
Peter Kovach; *Inside Direct3D—The Definitive Guide for Real-Time 3D Power and Performance for Microsoft Windows*; 2000; Chps. 1, 7, 15; Microsoft Press; U.S.
M. Farsi and M. Barbosa; *CANopen Implementation—Applications to Industrial Networks*; 2000; Chps. 1, 2 and 3; Research Studies Press Ltd.; England and U.S.
Wolfhard Lawrenz; *CAN System Engineering—From Theory to Practical Applications*; 1997; Chps. 1, 2.1, 2.2, 3.2 and 4.1; Springer-Verlag New York, Inc.; U.S.
Allen-Bradley; "CNCnet Software Library"; Oct. 1992; Publication 8000-6.1.1; U.S.
Robert Bosch GmbH; "CAN Specification"; Sep. 1991; Version 2.0.
Sisco, Inc.; "Overview and Introduction to the Manufacturing Message Specification (MMS)"; 1994-1995; Revision 2; Systems Integration Specialists Company, Inc.; Sterling Heights, Michigan, U.S.
ISO-9506-1 "Industrial Automation Systems—Manufacturing Message Specification—Part 1: Service definition"; Aug. 2000; pp. i-22; ISO/IEC; Switzerland.
ISO-9506-2 "Industrial Automation Systems—Manufacturing Message Specification—Part 2: Protocol specification"; Aug. 2000; pp. i.-6; ISO/IEC; Switzerland.
Sisco, Inc.; "MMS-EASE"; Jan. 1996; Systems Integration Specialists Company, Inc.; Sterling Heights, Michigan, U.S.
ANSI/EIA-484-A "Electrical and Mechanical Interface Characteristics and Line Control Protocol Using Communication Control Characters for Serial Data Link Between a Direct Numerical Control System and Numerical Control Equipment Employing Asynchronus Full Duplex Transmission"; Jun. 1995; Electronic Industries Association; U.S.
ISO/IEC 7498-1 "Information Technology—Open Systems Interconnection-Basic Reference Model: The Basic Model"; Nov. 1994; U.S.
ISO/IEC 7498-3 "Information Technology—Open Systems Interconnection-Basic Reference Model: Naming and Addressing"; Apr. 1997; U.S.
Todd J. Schuett; "The Benefits and Data Bottlenecks of High Speed Milling"; Aug. 1995; conference paper presented at Southeastern Michigan Chapter American Mold Builders Association; Creative Technology Corporation; U.S.
Todd J. Schuett; "The Ultimate DNC; Direct CNC Networking (DCN)"; *Modern Machine Shop*; Jan. 1996; Creative Technology Corporation; U.S.
Todd J. Schuett; "Advanced Controls for High Speed Milling"; conference paper presented at the SME "High Speed Machining" conference; May 7-8, 1996; Creative Technology Corporation; U.S.
Leitao, Machado & Lopes; "A Manufacturing Cell Integration Solution"; paper developed at CCP as a part of the ESPRIT 5629 Project; Oct. 1995.
Mitsubishi Electric; *Mitsubishi Electric Advance: Programmable Logic Controllers Edition*; Sep. 1996; vol. 76; Mitsubishi Electric Corporation; Tokyo.
Farsi, M.; "Flexible and Reliable Robotics Cells in Factory Automation"; 1993; pp. 520-525.
Chu & Wang; "Development of a Practical SFC System for CNC Machine Shop"; *International Conference on Data and Knowledge Systems for Manufacturing and Engineering*; May 1994; pp. 362-367, vol. 1; pp. xx+745, vol. 2.; Chinese Univ.; Hong Kong.
Farsi, M.; "Device Communication for Flexible Manufacturing:-A New Concept"; 1994; pp. 328-334.
Farsi, M.; "A Production Cell Communication Model in Factory Automation Using the Controller Area Network"; 1995; pp. 90-95.
Farsi, M. "CANopen: The Open Communications Solution"; 1996; pp. 112-116.
Katayama et al.; "A Motion Control System with Event-driven Motion-module Switching Mechanism for Robotic Manipulators"; *IEEE International Workshop on Robot and Human Communication*; Jul. 1993; pp. 320-325; U.S.

Matsui et al.; "An Event-Driven Architecture for Controlling Behaviors of the Office Conversant Mobile Robot, *Jiro-2*"; *Proceedings of the 1997 IEEE International Conference on Robotics and Automation*; Apr. 1997; pp. 3367-3372; U.S.

Microsoft Corporation; "How to Write and Use ActiveX Controls for Microsoft Windows CE 3.0"; *Windows CE 3.0 Technical Articles*; Jun. 2000; pp. 1-5.

Microsoft Corporation; "Notes on Implementing an OLE Control Container"; *ActiveX Controls Technical Articles*; Sep. 21, 1994; pp. 1-47.

Microsoft Corporation; "What OLE Is Really About"; *OLE (General) Technical Articles*; Jul. 1996; pp. 1-33.

U.S. Appl. No. 2001/0020944 to Brown et al., Sep. 13, 2001.

U.S. Appl. No. 2001/0032268 to Brown et al., Oct. 18, 2001.

Precision Microcontrol; "Precision MicroControl Product Guide", Date Unknown, pp. 11, 27-28.

Fitzgerald, M. , Barbera, A.; "A Low-Level Control Interface for Robot Manipulators", Robotics and Computer-Integrated Manufacturing, 1985, vol. 2, No. 3/4, pp. 201-213.

Rembold, J. , Blume, C. , Frommherz, B.; "The Proposed Robot Software Interfaces SRL and IRDATA", Robotics and Computer-Integrated Manufacturing, 1985, vol. 2, No. 3/4, pp. 219-225.

Taylor, R.; "A General Purpose Control Architecture for Programmable Automation Research", IBM T.J. Watson Research Center, 1986, pp. 165-173.

Hayward, V. , Paul, R.; "Robot Manipulator Control under Unix RCCL: A Robot Control "C" Library", The International Journal of Robotics Research, 1986, vol. 5, No. 4, pp. 94-111.

Lloyd, J. , Parker, M. , McClain, R.; "Extending the RCCL Programming Environment to Multiple Robots and Processors", IEEE, 1988, pp. 465-469.

Mangaser, A. , Wang, Y. , Butner, S.; "Concurrent Programming Support for a Multi-Manipulator Experiment on RIPS", IEEE, 1989, pp. 853-859.

Tesar, D. , Butler, M.; "A Generalized Modular Architecture for Robot Structures", American Society of Mechanical Engineers, Jun. 1, 1989, pp. 91-118.

Bloom, H.; "Software and Computer Integrated Manufacturing", 1990, pp. 1-14.

Kasahara, T.; "MAP 3.0 Entering the Practical Use Period in the CIM Era: MAP 3.0 MMS Architecture and Mounting Method", Ohmsha Ltd., Mar. 1, 1990, pp. 57-62, Computer and Network LAN vol. 8, No. 3.

Miller, D. , Lennox, C.; "An Object-Oriented Environment for Robot System Architectures", IEEE Control Systems, Feb. 1, 1991, pp. 14-23.

Yared, W. , Sheridan, T.; "Plan Recognition and Generalization in Command Languages with Application to Telerobotics", IEEE, Mar. 1, 1991, vol. 21, No. 2, pp. 327-338.

Senehi, M. , Wallace, S. , Barkmeyer, E. , Ray, S. , Wallace, E.; "Control Entity Interface Document", Jun. 1, 1991, pp. 1-38.

Smith, M.; "An Environment for More Easily Programming a Robot", International Conference on Robotics and Automation, May 1, 1992, pp. 10-16.

Nielsen, L. , Trostmann, S. , Trostmann, E.; "Robot Off-line Programming and Simulation As a True CIME-Subsystem", International Conference on Robotics and Automation, May 1, 1992, pp. 1089-1094.

Albus, J.; "A Reference Model Architecture for Intelligent Systems Design", NIST, 1993, pp. 1-38.

Wallace, S. , Senehi, M. , Barkmeyer, E. , Ray, S. , Wallace, E.; "Control Entity Interface Specification", Sep. 1, 1993, pp. 10-20.

Proctor, F. , Damazo, B. , Yang, C. , Frechette, S.; "Open Architectures for Machine Control", NIST, 1994, pp. 1-17.

U.S. Department of Energy; "Robotic Technology Development Program", Feb. 1, 1994, pp. 1-114.

Miller, D.; "Using Generic Tool Kits to Build Intelligent Systems (AIAA 94-1214)", Sandia National Laboratories, Mar. 9, 1994, pp. 1-9.

Sakai, K.; "Object Orientation and C++ Language: Facts of Object-Oriented Programming", CQ Publishing Co., Ltd., Jun. 1, 1994, vol. 20, No. 6, pp. 83-93.

Hori, K.; "Protocol Conversion Software That Makes Possible Communication between Different Types of Field Devices", Cosmo Technica, Sep. 1, 1994, pp. 1-12.

Daiyo, M.; "The Full Color Era Has Arrived with Scanner and Printer Development", Nikkei Byte, Oct. 1, 1994, No. 130, pp. 160-172.

Senehi, M. , Kramer, T. , Michaloski, J. , Quintero, R. , Ray, S. , Rippey, W., Wallace, S.; "Reference Architecture for Machine Control Systems Integration: Interim Report", Oct. 20, 1994, pp. 1-52.

Putnam, F.; "The WinSEM OLE Messaging Architecture Working Paper", Labtech, Dec. 1, 1994.

Fanuc Ltd.; "Fancu Robot i series Product Manual", 1995, pp. 1-8.

Koizumi, A.; "Pursuing Design Development with a Focus on Compatibility and Permeability with Incorporation of Worldwide Standard Specifications", Instrumentation: Instrumentation and Control Engineering, May 1, 1995, vol. 38, No. 5, pp. 58-62.

Ge Fancu; "TCP/IP Ethernet Communications for the Series 90 -70 PLC", 1996.

Baruch, J. , Cox, M.; "Remote control and robots: an Internet solution", Computing and Control Engineering Journal, Feb. 1, 1996.

Burchard, R. , Feddema, J.; "Generic Robotic and Motion Control API Based on GISC-Kit Technology and CORBA Communications", Sandia National Laboratories, Apr. 1, 1996, pp. 712-717.

Schneeman, R.; "Device Driver Development for Microsoft Windows NT: Accessing Motion Control Hardware Using a Multimedia Framework", NIST, Oct. 1, 1996, pp. 1-43.

Suzuki, T. , Fujii, T. , Yokota, K. , Asama, H. , Kaetsu, H. , Endo, I.; "Teleoperation of Multiple Robots through the Internet", Nov. 14, 1996, pp. 84-88.

Kapoor, C.; "A Reusable Operational Software Architecture for Advanced Robotics", UMI, Dec. 1, 1996, pp. vi-vii, 1-79, 111-253, 302-368 (ch1, ch2, ch4, ch5 and ch7).

OPC Foundation; "OLE for Process Control, Data Access Standard", Sep. 11, 1997, Updated, version 1.0A, Chapter 1-5 (pp 1-169).

Jennings, R.; "Special Edition Using Access 97, Second Edition", Que, Oct. 9, 1997, Chapter 25.

Ge Fanuc; "Windows '95 and Windows NT 32-Bit Drivers and Libraries for Open CNC Systems", Nov. 1, 1997, pp. 8-828.

Hall, E.; "Intelligent Robot Trends for 1998", University of Cincinnati, 1998, pp. 1-13.

Siemens AG Automation and Drives; "IT-Solutions for Machine Tools: SinCOM Computer Link SINUMERIK 840D/810D Description of Functions", 1998, 272 pages.

Xiaowei, M. , Xiaoli, L. , Yulin, M. , Hegao, C.; "Real-time Self-reaction of Mobile Robot with Genetic Fuzzy Neural Network in Unknown Environment", Proceedings of the IEEE Intl. Conf. on Sys, Man, and Cybernetics, 1998, vol. 4.

Claverie, S.; "Working the 'NET: Developing Applications with Internet Information Server and Visual Basic Active X Controls", Loyola University, Sep. 1, 1998, pp. 158-162.

Ge Fanuc; "Open Systems (Type II High Speed Serial Bus Setup for 32-Bit Windows 95 and Windows NT Applications) User's Manual", Oct. 1, 1998, pp. 1-1 to B-5.

OPC Foundation; "OPC Overview", Oct. 27, 1998, Version 1.0.

Ge Fanuc; "Cimplicity HMI OPC Server", Apr. 1, 1999.

Platt, D.; "Understanding COM+: Events", Microsoft Press, Jun. 30, 1999, pp. 149-182.

Platt, D.; "Understanding COM+: Security", Microsoft Press, Jun. 30, 1999, pp. 44-57.

Jara; "Specifications of ORiN (Ver. 0.5)", Aug. 1, 1999.

Jeppsson, J.; "Sensor Based Adaptive Control and Prediction Software—Keys to Reliable HSM", The Boeing Company, Nov. 3, 1999.

Ge Fanuc; "Cimplicity HMI for CNC—CNC Machining Interface Plus Operation Manual", Dec. 1, 1999, pp. 1-1 to B-2.

Lego; "Lego Mindstorms RCX 2.0 Firmware Command Overview", Jul. 4, 2000.

Ott, M. , Reininger, D. , Makwana, D. , Singh, M.; "U.S. Appl. No. 2002/0150093", USPTO, Aug. 16, 2000.

Ge Fanuc; "Cimplicity Integrator's Toolkit—Application Developer's Guide", Dec. 1, 2000, pp. 1-1 to 48-12.

Nacsa, J.; "Comparison of Three Different Open Architecture Controllers", 2001.

Evolution Robotics, Inc.; "ERSP 3.0—Getting Starting Guide", 2001.

Evolution Robotics, Inc.; "ERSP 3.0—Robotic Development Platform", 2001, pp. 1-1134.
Evolution Robotics, Inc.; "ERSP 3.0—Tutorials", 2001.
Evolution Robotics, Inc.; "ERSP 3.0—User's Guide", 2001.
Jara; "Outline of ORiN (Open Robot Interface for the Network)", 2001.
Lee, K.; "U.S. Publication No. 2002/0052939", USPTO, Feb. 8, 2001.
Brown, D. , Clark, J.; "U.S. Publication No. 2002/0165627", USPTO, Feb. 9, 2001.
Aronoff, E. , Collings, J.; "U.S. Publication No. 2002/0049776 A1", USPTO, Feb. 12, 2001.
Roy-G-Biv Corporation; "Pleadings: Plaintiff Roy-G-Biv Corporation's Complaint for Patent Infringement and Demand for Jury Trial", Sep. 19, 2007, pp. 1-9.
GE Fanuc; "Pleadings: Defendants Fanuc Ltd., Fanuc Robotics America, Inc., GE Fanuc Automation Americas, Inc., and GE Fanuc Intelligent Platforms, Inc.'s Answer to Plaintiff's Complaint for Patent Infringement and Counterclaims for Invalidity and Noninfringement", Nov. 15, 2007, pp. 1-12.
GE Fanuc; "Pleadings: Motion to Dismiss", Nov. 21, 2007, 9 pages.
Roy-G-Biv Corporation; "Pleadings: Plaintiff Roy-G-Biv Corporation's Reply to Defendants' Counterclaims for Invalidity and Noninfringement", Dec. 10, 2007, pp. 1-5.
GE Fanuc; "Pleadings: Defendant GE Fanuc Automation Americas, Inc.'s Notice of Change of Corporate Name", Dec. 14, 2007, pp. 1-3.
U.S. Appl. No. 10/316,451, filed Dec. 10, 2002, Brown et al.
U.S. Appl. No. 10/761,537, filed Jan. 21, 2004, Brown et al.
U.S. Appl. No. 10/844,025, filed May 12, 2004, Brown et al.
U.S. Appl. No. 10/966,848, filed Oct. 14, 2004, Brown et al.
U.S. Appl. No. 11/067,327, filed Feb. 25, 2005, Brown et al.
U.S. Appl. No. 11/084,673, filed Mar. 18, 2005, Brown et al.
U.S. Appl. No. 11/416,660, filed May 3, 2006, Brown et al.
U.S. Appl. No. 11/375,502, filed Mar. 13, 2006, Brown et al.
U.S. Appl. No. 11/370,082, filed Mar. 6, 2006, Brown et al.
U.S. Appl. No. 11/418,075, filed May 4, 2006, Brown et al.
U.S. Appl. No. 11/454,053, filed Jun. 17, 2006, Brown et al.
U.S. Appl. No. 11/505,056, filed Aug. 15, 2004, Brown et al.
U.S. Appl. No. 11/583,233, filed Oct. 19, 2006, Brown et al.
U.S. Appl. No. 11/728,801, filed Mar. 22, 2007, Brown et al.
Pacific Scientific; "Advanced Motion Language", Date Unknown, pp. C-2 thru C-11.
Moore; "Advanced Process Automation and Control System (APACS Product Literature)", Date Unknown, pp. 1-13.
Katila, P.; "Applying Total Productive Maintenance—TPM Principles in the Flexible Manufacturing Systems", Lulea Tekniska Universitet, Date Unknown, pp. 1-41.
Silma; "CimStation Product Literature", Date Unknown, pp. 1-12.
Fanuc Robotics North America; "Manufacturing solutions for value-minded companies (Product Brochure)", Date Unknown, pp. 1-5.
Highland Technology, Inc.; "Perfect Parts Product Literature", Date Unknown, pp. 1-4.
Mitutoyo; "Quick Vision Product Literature", Date Unknown, pp. 1-8.
Fanuc Robotics North America; "Robotic Palletizing Provides Flexibility at High Speeds", Date Unknown, pp. 1-2.
Fanuc Robotics North America; "The Growing Demand for Advanced Robotic Packaging Systems", Date Unknown, pp. 1-2.
Mack, B. , Bayoumi, M.; "Design and Integration of New Software for the Robot Controller Test Station", IEEE, 1988, pp. 866-873.
Pritchard, K. , Anonymous; "Appying Simulation to The Control Industry", Cahners Publishing Company, May 1, 1989, pp. 1-3 (reprinted from Control Engineering, May 1989).
Vaataja, H. , Hakala, H. , Mattila, P. , Suoranta, R.; "3-D Simulation of Ultrasonic Sensor System in Mobile Robots", IEEE, 1992, pp. 333-336.
USdata; "FactoryLink IV for Microsoft Windows and NT", 1992, pp. 1-4.
National Instruments; "IEEE 488 and VXIbus Control, Data Acquisition, and Analysis (Catalog)", 1993, pp. Main Table of Contents, Introduction pp. ii-xi, Section 1 Instrumentation Software Products.
Software Horizons, Inc.; "Operator Interface Software for Supervisory Control, Monitoring and Reporting For Windows Operating System (Product Literature)", 1993, pp. 1-12.
Pro-Log Corporation; "Pro-Log Motion Control for Allen-Bradley PLCs (Product Literature)", 1993, pp. 1-5.
Tele-Denken Resources, Inc.; "VIEWpoint (Product Data Sheet)", 1993, pp. 1-11.
Pritchard, K.; "PC-based Simulation In Control System Design", Cahners Publishing Company, Feb. 1, 1993, pp. 1-2 (reprinted from Control Engineering, Feb. 1993).
Laduzinsky, A.; "An Open Look for PLC Programs", Cahners Publishing Company, May 1, 1993, p. 1 (reprint from Control Engineering—May, 1993).
Christensen, J.; "Programmable controller users and makers to go global with IEC 1131-3", Instrument and Control Systems, Oct. 1, 1993, pp. 1-4 (reprint from Instrument and Control Systems—Oct. 1993).
National Instruments; "LabWindows/CVI Product Literature", 1994, pp. 1-8.
Honeywell Inc.; "SDS Physical Layer Specification", 1994, pp. 1-34.
Steeplechase Software, Inc.; "Visual Logic Controller (Product Literature)", 1994, pp. 1-3.
Tele-Denken Resources, Inc.; "The History of Programmable Controllers", Apr. 1, 1994, pp. 1-26.
Wonderware; "InTouch 5 Lite (Product Data Sheet)", Apr. 14, 1994, pp. 1-4.
Wonderware; "InTouch 5 (Product Data Sheet)", Apr. 19, 1994, pp. 1-4.
Wonderware; "InTouch 5 PDK/NT (Product Data Sheet)", Apr. 19, 1994, pp. 1-4.
Control; "Simulation Software Helps Troubleshoot PLC Code", Jun. 1, 1994, p. 1 (reprinted from Control, Jun. 1994).
Tele-Denken Resources, Inc.; "SoftPLC (Product Data Sheet)", Jun. 1, 1994, pp. 1-5.
Tele-Denken Resources, Inc.; "TopDoc (Product Data Sheet)", Oct. 1, 1994, pp. 1-7.
National Instruments; "LabVIEW Graphical Programming for Instrumentation", 1995, pp. 1-16.
Wizdom Controls, Inc.; "Paradym-31 Software Brochure", 1995, pp. 1-4.
Fanuc Robotics North America; "SpotTool Application Software", 1995, pp. 1-2.
Iconics, Inc.; "Configuring Input/Output (I/O) Devices (GENISIS Product Guide)", Feb. 15, 1995, pp. 1-31.
Quinn, T. , George, G.; "Windows 95 Marks a New Era in PC-Based Automation", Cahners Publishing Company, Mar. 1, 1995, pp. 19-20, 22 (Control Engineering, Mar. 1995).
Automation and Control; "PLC Programming Standard Expands", Apr. 1, 1995, pp. 3-4 (Reprinted from Automation and Control, Apr. 1995).
Cahners Publishing Company; "PC Control Software Combines Ladder Logic, HMI and I/O", May 1, 1995, pp. 1-3 (reprint from Control Engineering—May, 1995).
Oasys Group, Inc.; "Oasys Open Architecture System", Jul. 11, 1995, pp. 1-23.
Cahners Publishing Company; "PC Software Adds 'Joy-of-Use' To Power and Flexibility", Sep. 1, 1995, pp. 2-3 (reprinted from Control Engineering, Sep. 1995).
Wonderware; "InTouch 5.6 (Product Data Sheet)", Sep. 15, 1995, pp. 1-4.
Arc Advisory Group; "PC-Based Control Strategies", Oct. 1, 1995.
Wonderware; "InTrack Manufacturing Execution System (Product Data Sheet)", Nov. 15, 1995, pp. 1-5.
Kagami, S. , Tamiya, Y. , Inaba, M. , Inoue, H.; "Design of Real-Time Large Scale Robot Software Platform and its Implementation in the Remote-Brained Robot Project", IEEE, 1996, pp. 1394-1399.
Factorysoft, Inc.; "FactorySoft Report Product Literature", 1996, pp. 1-2.
Galil Motion Control; "Motion Control Product Catalog", 1996, pp. 1-10, 82-91, 106-125.
GE Fanuc Automation; "PowerMotion Servo and Machine Control (Product Brochure)", 1996, pp. 1-8.

Compumotor Division, Parker Hannifin; "Step Motor and Servo Motor Systems and Controls", 1996, pp. 1, 28-29.

Sperber, B.; "Try These Two Little Disks for a Bit Step In Streamlined, Object-Oriented SCADA", Control, Apr. 1, 1996, pp. 1-2 (reprinted from CONTROL—April, 1996).

Ge Fanuc Automation; "GE Fanuc Automation Product Guide", May 1, 1996, pp. 1-8.

National Instruments; "Lookout Product Literature", May 15, 1996, pp. 1-12.

Fusaro, D.; "A Standard for Programming PLCs Emerges—Now What?", Control, Jun. 1, 1996, pp. 1-4 (reprint from CONTROL—Jun. 1993).

GE Fanuc Automation; "Cimplicity Product Brochure", Jun. 1, 1996, pp. 1-4.

Siemens Energy and Automation, Inc.; "Siemens Automation Technology Newsletter (Q2/96)", Jul. 1, 1996, pp. 1-24.

Steeplechase Software, Inc.; "Flow Charts Give Focus to Manufacturing", Oct. 1, 1996, pp. 1-2 (Reprinted from Managing Automation, Oct. 1996).

Wonderware; "The Factory Suite Product Literature", 1997, pp. 1-34.

Cahners Publishing Company; "Software Allows Combined Relay Ladder Logic And Flowchart Programming", Feb. 1, 1997, p. 1 (Reprint from Control Engineering, Feb. 1997).

Nematron Corporation; "Nematron OpenControl Product Literature", Mar. 15, 1997, pp. 1-7.

Compumotor Division, Parker Hannifin; "Motion Toolbox User Guide (A Library of LabVIEW Virtual Instruments for Motion Control)", Jun. 1, 1997, pp. i-v, 7-10, 85-93.

Yamamoto, K. , Sawabe, T. , Ishii, H. , Ema, S. , Takahashi, T.; "U.S. Publication No. 2002/0181937", USPTO, Nov. 28, 1997.

Iconics, Inc.; "Genesis32 Version 5.2 Product Workshop", 1998, pp. 1-248.

Pirjanian, P.; "Behavior Coordination Mechanisms—State-of-the-art", USC Robotics Research Laboratory, Oct. 7, 1999, pp. 1-49.

Arc Advisory Group; "HMI Software Strategies", Apr. 1, 2000, pp. 1-16.

Arc Advisory Group; "E=Security Strategies for Enterprises", May 1, 2000, pp. 1-20.

Arc Advisory Group; "Open Control Strategies", May 1, 2000, pp. 1-20.

Deltheil, C. , Didier, L. , Hospital, E. , Brutzman, D.; "Simulating an Optical Guidance System for the Recovery of an Unmanned Underwater Vehicle", IEEE Journal of Oceanic Engineering, Oct. 1, 2000, pp. 568-574.

Tajima, S. , Rekimoto, J. , Ayatsuka, Y. , Matsushita, N. , Hasegawa, T. , Karasawa, H. , Sciammarella, E.; "U.S. Publication No. 2003/0109959", USPTO, Oct. 20, 2000.

Roy-G-Biv Corporation; "Pleadings: Plaintiff Roy-G-Biv Corporation's Response to GE Fanuc Automation Corporation's Motion to Dimiss", Dec. 13, 2007, pp. 1-54.

GE Fanuc; "Pleadings: GE Fanuc Automation Corporation's Reply in Support of its Motion to Dismiss for Lack of Personal Jurisdiction", Dec. 28, 2007, pp. 1-25.

Roy-G-Biv Corporation; "Pleadings: Joint Conference Report", Jan. 4, 2008, pp. 1-6.

Roy-G-Biv Corporation; "Pleadings: Roy-G-Biv Corporation's First Set of Interrogatories (Nos. 1-16) for Each Defendant", Jan. 18, 2008, pp. 1-16.

Roy-G-Biv Corporation; "Pleadings: Roy-G-Biv Corporation's First Set of Requests to Defendants for Document, Electronically Stored Information, and Things", Jan. 18, 2008, pp. 1-19.

GE Fanuc; "Pleadings: Defendants Fanuc Ltd.'s, Fanuc Robotics America, Inc.'s, GE Fanuc Automation Americas, Inc.'s, and GE Fanuc Intelligent Platforms, Inc.'s First Set of Interrogatories to Plaintiff Roy-G-Biv Corporation", Jan. 25, 2008, pp. 1-10.

GE Fanuc; "Pleadings: Defendants Fanuc Ltd.'s, Fanuc Robotics America, Inc.'s, GE Fanuc Automation Americas, Inc.'s, and GE Fanuc Intelligent Platforms, Inc.'s First Set of Requests for Production to Plaintiff Roy-G-Biv Corporation", Jan. 31, 2008, pp. 1-25.

GE Fanuc; "Pleadings: Defendant's Initial Disclosures Pursuant to Federal Rule of Civil Procedure 26(a)(1)", Feb. 1, 2008, pp. 1-6.

Roy-G-Biv Corporation; "Pleadings: Plaintiff Roy-G-Biv Corporation's Initial Disclosure", Feb. 1, 2008, pp. 1-5.

Microsoft Corporation; "Dynamic Data Exchange"; *Windows 3.1 SDK Guide to Programming*; 1992, 1993; Chapter 22; 21 pages.

Microsoft Corporation; "Dynamic Data Exchange Management Library"; *Win32 SDK: Prog. Ref. Vol. 2*; 1992, 1993; Chapter 77; 26 pages.

Microsoft Corporation; "Network Dynamic Data Exchange"; *Windows for Workgroups 3.1 Resource Kit*; 1992, 1993; Chapter 11; 19 pages.

Stewart, Schmitz, Khosla; "Implementing Real-Time Robotic Systems Using CHIMERA II", IEEE, 1990, pp. 254-255, Sections 3.1 and 3.2.

Paidy, Reeve; "Software Architecture for a Cell Controller", IEEE, 1991, pp. 344-349.

Payton, D. , Bihari, T.; "Intelligent Real-Time Control of Robotic Vehicles", ACM, Aug. 1, 1991, pp. 49-63, vol. 34, No. B.

Tanaka, K.; "U.S. Appl. No. 2002/0044297 A1", Apr. 18, 2002.

Blasvaer, Pirjanian; "An Autonomous Mobile Robot System", Jun. 8, 1994, pp. 52-61 and 122-124, Chapters 4 and 6.7.

Pirjanian, Christensen; "Hierarchical Control for Navigation Using Heterogeneous Models", Nov. 1, 1995, 19 pages, Denmark.

Globalspec; "About CNC Controllers", 1999, Internet Location: http://motion-controls.globalspec.com/LearnMore/Motion_Controls/Machine_Motion_Controllers/CNC_Controllers.

Brown, K.; "SOAP for Platform Neutral Interoperability", Sep. 1, 2000, 16 pages.

Semi; "Semi E4-0699 Semi Equiptment Communications Standard 1 Message Transfer (SECS-I)", Jan. 2, 1980.

Semi; "Semi E5-1104 Semi Equipment Communications Standard 2 Message Content (SECS-II)", 1982.

Semi; "Semi E30-1103 General Model For Communications and Control of Manufacturing Equipment (GEM)", 1992.

Brown, D.; Clark, J.; "Foreign FileHist: European Patent Publication No. EP2302475", Mar. 30, 2011, EPO, (149 pages).

Roy-G-Biv Corporation; "USPTO Patent FileHist: P216040 (U.S. Appl. No. 12/406,921) File History—Response to Non-Final Office Action", Apr. 4, 2011, (3 pages).

EPO; "Foreign FileHist: European Patent Application No. EP08013237—Examination Report", Apr. 5, 2011, (5 pages).

USPTO; "USPTO Patent FileHist: (U.S. Appl. No. 11/370,082) File History—Non-Final Office Action", Apr. 11, 2011, (34 pages).

Roy-G-Biv Corporation; "USPTO Patent FileHist: (U.S. Appl. No. 10/405,883) File History—Amendment After Final Rejection", May 10, 2011, (9 pages).

USPTO; "USPTO Patent FileHist: (U.S. Appl. No. 12/494,163)—Non Final Office Action", May 12, 2011, (7 pages).

USPTO; "ReEx: U.S. Patent No. 6,513,058 Reexamination (Control No. 95/000,398)—Notice of Intent to Issue Inter Partes ReExamination Certificate", Mar. 28, 2011, (5 pages).

USPTO; "ReEx: U.S. Patent No. 6,516,236 Reexamination (Control No. 95/000,396)—Notice of Intent to Issue Inter Partes ReExamination Certificate", Mar. 28, 2011, (5 pages).

Roy-G-Biv Corporation; "ReEx: U.S. Patent No. 6,941,543 Reexamination (Control No. 95/000,397)—Patent Owner's Appeal Brief", Apr. 22, 2011, (23 pages).

Roy-G-Biv Corporation; "USPTO Patent FileHist: 7110.00002 (U.S. Appl. No. 12/263,953)—Request for Continued Examination", Jun. 9, 2011, (7 pages).

Roy-G-Biv Corporation; "Foreign FileHist: European Patent Application No. EP04809804—Response to Examination Report", Jun. 16, 2011, (16 pages).

USPTO; "USPTO Patent FileHist: (U.S. Appl. No. 12/557,722) File History—Notice of Allowance", Jun. 16, 2011, (48 pages).

USPTO; "USPTO Patent FileHist: (U.S. Appl. No. 12/406,921) File History—Notice of Allowance", Jun. 23, 2011, (32 pages).

CIPO; "Foreign FileHist: Canadian Patent Application No. CA 2,705,404—Office Action", Jul. 4, 2011, (4 pages).

USPTO; "USPTO Patent FileHist: (U.S. Appl. No. 12/557,722) File History—Notice of Allowability", Jul. 18, 2011, (22 pages).

USPTO; "ReEx: U.S. Patent No. 5,691,897 Ex-Partes Reexamination (Control No. 90/009,282)—Certificate of Correction", May 24, 2011, (4 pages).

CIPO; "Foreign FileHist: Canadian Patent Application No. CA 2,625,283—Office Action", Jul. 11, 2011, (2 pages).

* cited by examiner

GENERATION AND DISTRIBUTION OF MOTION COMMANDS OVER A DISTRIBUTED NETWORK

RELATED APPLICATIONS

The present application U.S. patent application Ser. No. 10/405,883 filed Apr. 1, 2003 is a continuation of U.S. patent application Ser. No. 09/790,401 filed Feb. 21, 2001, now U.S. Pat. No. 6,542,925, which claims priority of U.S. Provisional Patent Application Ser. Nos. 60/184,067 filed on Feb. 22, 2000, and 60/185,557 filed on Feb. 28, 2000.

U.S. patent application Ser. No. 09/790,401 filed Feb. 21, 2001, is a continuation-in-part of U.S. patent application Ser. No. 09/699,132 filed Oct. 27, 2000, now U.S. Pat. No. 6,480,896, which claims priority of U.S. Provisional Patent Application Ser. Nos. 60/161,901 filed on Oct. 27, 1999, 60/162,989 filed on Nov. 1, 1999, 60/162,802 filed on Nov. 1, 1999, 60/162,801 filed on Nov. 1, 1999, 60/182,864 filed on Feb. 16, 2000, and 60/185,192 filed on Feb. 25, 2000. The contents of all related applications listed above are incorporated herein by reference.

TECHNICAL FIELD

The present invention relates to motion control systems and, more particularly, to a software system that facilitates the creation and distribution of motion control software.

BACKGROUND OF THE INVENTION

The purpose of a motion control device is to move an object in a desired manner. The basic components of a motion control device are a controller and a mechanical system. The mechanical system translates signals generated by the controller into movement of an object.

While the mechanical system commonly comprises a drive and an electrical motor, a number of other systems, such as hydraulic or vibrational systems, can be used to cause movement of an object based on a control signal. Additionally, it is possible for a motion control device to comprise a plurality of drives and motors to allow multi-axis control of the movement of the object.

The present invention is of particular importance in the context of a target device or system including at least one drive and electrical motor having a rotating shaft connected in some way to the object to be moved, and that application will be described in detail herein. But the principles of the present invention are generally applicable to any target device or system that generates movement based on a control signal. The scope of the present invention should thus be determined based on the claims appended hereto and not the following detailed description.

In a mechanical system comprising a controller, a drive, and an electrical motor, the motor is physically connected to the object to be moved such that rotation of the motor shaft is translated into movement of the object. The drive is an electronic power amplifier adapted to provide power to a motor to rotate the motor shaft in a controlled manner. Based on control commands, the controller controls the drive in a predictable manner such that the object is moved in the desired manner.

These basic components are normally placed into a larger system to accomplish a specific task. For example, one controller may operate in conjunction with several drives and motors in a multi-axis system for moving a tool along a predetermined path relative to a workpiece.

Additionally, the basic components described above are often used in conjunction with a host computer or programmable logic controller (PLC). The host computer or PLC allows the use of a high-level programming language to generate control commands that are passed to the controller. Software running on the host computer is thus designed to simplify the task of programming the controller.

Companies that manufacture motion control devices are, traditionally, hardware oriented companies that manufacture software dedicated to the hardware that they manufacture. These software products may be referred to as low level programs. Low level programs usually work directly with the motion control command language specific to a given motion control device. While such low level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

In this overall context, a number of different individuals are involved with creating a motion control system dedicated to performing a particular task. Usually, these individuals have specialized backgrounds that enable them to perform a specific task in the overall process of creating a motion control system. The need thus exists for systems and methods that facilitate collaboration between individuals of disparate, complimentary backgrounds who are cooperating on the development of motion control systems.

Conventionally, the programming and customization of motion systems is very expensive and thus is limited to commercial industrial environments. However, the use of customizable motion systems may expand to the consumer level, and new systems and methods of distributing motion control software, referred to herein as motion media, are required.

PRIOR ART

A number of software programs currently exist for programming individual motion control devices or for aiding in the development of systems containing a number of motion control devices.

The following is a list of documents disclosing presently commercially available high-level software programs: (a) Software Products For Industrial Automation, iconics 1993; (b) The complete, computer-based automation tool (IGSS), Seven Technologies A/S; (c) OpenBatch Product Brief, PID, Inc.; (d) FIX Product Brochure, Intellution (1994); (e) Paragon TNT Product Brochure, Intec Controls Corp.; (f) WEB 3.0 Product Brochure, Trihedral Engineering Ltd. (1994); and (g) AIMAX-WIN Product Brochure, TA Engineering Co., Inc. The following documents disclose simulation software:

(a) ExperTune PID Tuning Software, Gerry Engineering Software; and (b) XANALOG Model NL-SIM Product Brochure, XANALOG.

The following list identifies documents related to low-level programs: (a) Compumotor Digiplan 1993-94 catalog, pages 10-11; (b) Aerotech Motion Control Product Guide, pages 233-34; (c) PMAC Product Catalog, page 43; (d) PC/DSP-Series Motion Controller C Programming Guide, pages 1-3; (e) Oregon Micro Systems Product Guide, page 17; (f) Precision Microcontrol Product Guide.

The Applicants are also aware of a software model referred to as WOSA that has been defined by Microsoft for use in the Windows programming environment. The WOSA model is discussed in the book Inside Windows 95, on pages 348-351. WOSA is also discussed in the paper entitled WOSA Backgrounder: Delivering Enterprise Services to the Windows-based Desktop. The WOSA model isolates application programmers from the complexities of programming to different service providers by providing an API layer that is independent of an underlying hardware or service and an SPI layer that is hardware independent but service dependent. The WOSA model has no relation to motion control devices.

The Applicants are also aware of the common programming practice in which drivers are provided for hardware such as printers or the like; an application program such as a word processor allows a user to select a driver associated with a given printer to allow the application program to print on that given printer.

While this approach does isolates the application programmer from the complexities of programming to each hardware configuration in existence, this approach does not provide the application programmer with the ability to control the hardware in base incremental steps. In the printer example, an application programmer will not be able to control each stepper motor in the printer using the provided printer driver; instead, the printer driver will control a number of stepper motors in the printer in a predetermined sequence as necessary to implement a group of high level commands.

The software driver model currently used for printers and the like is thus not applicable to the development of a sequence of control commands for motion control devices.

The Applicants are additionally aware of application programming interface security schemes that are used in general programming to limit access by high-level programmers to certain programming variables. For example, Microsoft Corporation's Win32 programming environment implements such a security scheme. To the Applicants' knowledge, however, no such security scheme has ever been employed in programming systems designed to generate software for use in motion control systems.

SUMMARY OF THE INVENTION

The present invention may be embodied as a method of causing movement of at least one target device based on at least one of a plurality of motion programs stored on a content server connected to a network. At least one identified characteristic of the at least one target device is identified. At least one selected motion program is selected from the plurality of motion programs stored on the content server. The at least one identified characteristic and the at least one selected motion program are transferred to the motion server. A motion media data set is generated at the motion server for the target motion device based on the at least one identified characteristic of the target device and the at least one selected motion program. The motion media data set is transferred from the motion server to the target motion device to cause the target device to perform the desired sequence of movements.

DETAILED DESCRIPTION OF THE INVENTION

Figure 1:
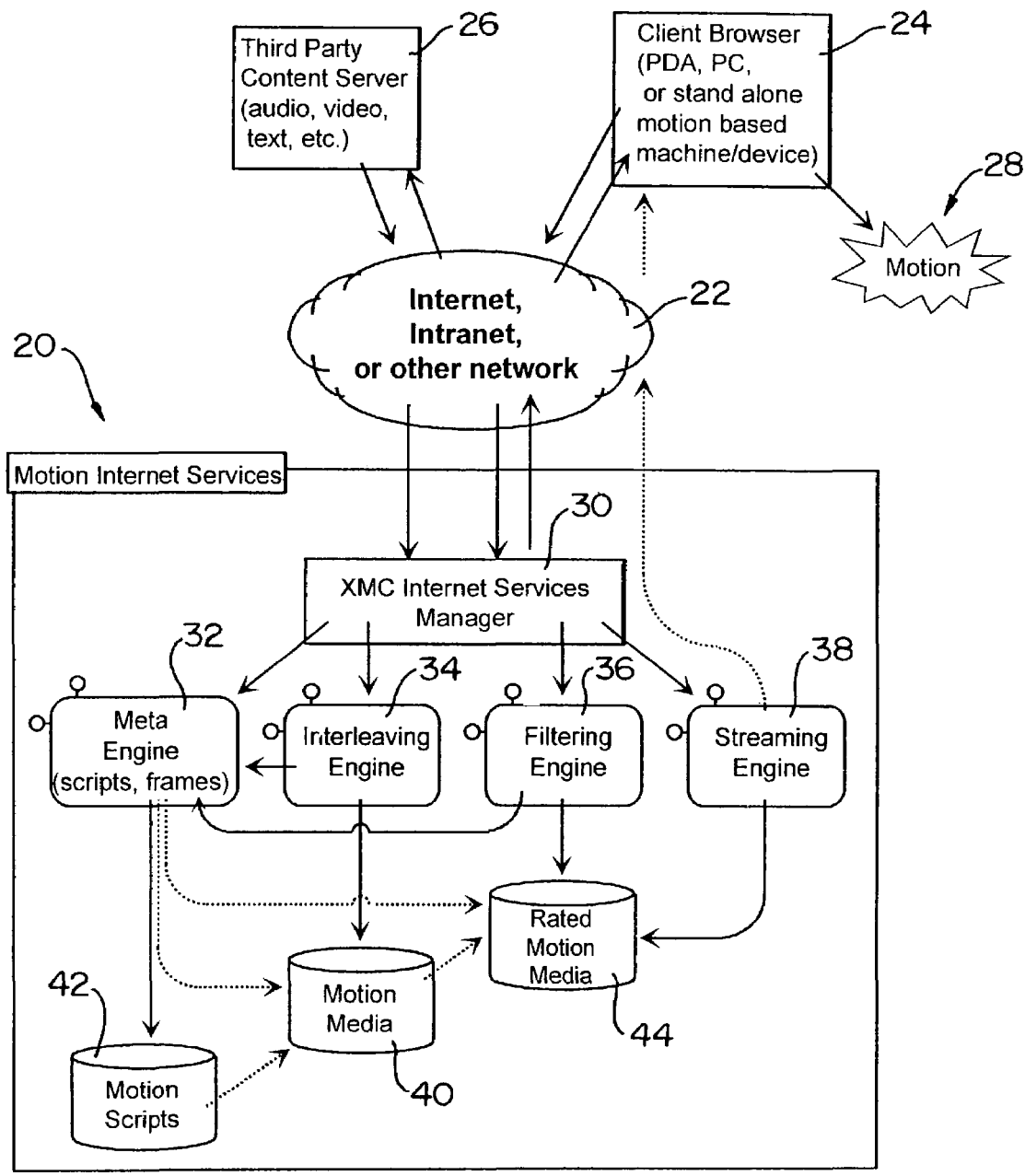
FIG. 1 is a system interaction map of an exemplary control software system constructed in accordance with the principles of the present invention.

Referring to FIG. 1 of the drawing, shown at 20 therein is a control software system adapted to generate, distribute, and collect motion content in the form of motion media over a distributed network 22 from and to a client browser 24 and a content server 26.

The distributed network 22 can be any conventional computer network such as a private intranet, the Internet, or other specialized or proprietary network configuration such as those found in the industrial automation market (e.g., CAN bus, DeviceNet, FieldBus, ProfiBus, Ethernet, Deterministic Ethernet, etc). The distributed network 22 serves as a communications link that allows data to flow among the control software system 20, the client browser 24, and the content server 26.

The client browsers 24 are associated with motion systems or devices that are owned and/or operated by end users. The client browser 24 includes or is connected to what will be referred to herein as the target device. The target device may be a hand-held PDA used to control a motion system, a personal computer used to control a motion system, an industrial machine, an electronic toy or any other type of motion based system that, at a minimum, causes physical motion. The client browser 24 is capable of playing motion media from any number of sources and also responds to requests for motion data from other sources such as the control software system 20. The exemplary client browser 24 receives motion data from the control software system 20.

The target device forming part of or connected to the client browser 24 is a machine or other system that, at a minimum, receives motion content instructions to run (control and configuration content) and query requests (query content). Each content type causes an action to occur on the client browser 24 such as changing the client browser's state, causing physical motion, and/or querying values from the client browser. In addition, the target device at the client browser 24 may perform other functions such as playing audio and/or displaying video or animated graphics.

The term "motion media" will be used herein to refer to a data set that describes the target device settings or actions currently taking place and/or directs the client browser 24 to perform a motion-related operation. The client browser 24 is usually considered a client of the host control software system 20; while one client browser 24 is shown, multiple client browsers will commonly be supported by the system 20. In the following discussion and incorporated materials, the roles of the system 20 and client browser 24 may be reversed such that the client browser functions as the host and the system 20 is the client.

Often, but not necessarily, the end users will not have the expertise or facilities necessary to develop motion media. In this case, motion media may be generated based on a motion program developed by the content providers operating the content servers 26. The content server systems 26 thus provides motion content in the form of a motion program from which the control software system 20 produces motion media that is supplied to the client browser 24.

The content server systems 26 are also considered clients of the control software system 20, and many such server systems 26 will commonly be supported by the system 20. The content server 26 may be, but is not necessarily, operated by the same party that operates the control software system 20.

Exhibit 1 attached hereto and incorporated by reference herein further describes the use of the content server systems 26 in communications networks. As described in more detail in Exhibit 1, the content server system 26 synchronizes and schedules the generation and distribution of motion media.

Synchronization may be implemented using host to device synchronization or device to device synchronization; in either case, synchronization ensures that movement associated with one client browser 24 is coordinated in time with movement controlled by another client browser 24.

Scheduling refers to the communication of motion media at a particular point in time. In host scheduling and broadcasting, a host machine is configured to broadcast motion media at scheduled points in time in a manner similar to television programming. With target scheduling, the target device requests and runs content from the host at a predetermined time, with the predetermined time being controlled and stored at the target device.

As briefly discussed above, the motion media used by the client browser 24 may be created and distributed by other systems and methods, but the control software system 20 described herein makes creation and distribution of such motion media practical and economically feasible.

Motion media comprises several content forms or data types, including query content, configuration content, control content, and/or combinations thereof. Configuration content refers to data used to configure the client browser 24. Query content refers to data read from the client browser 24. Control content refers to data used to control the client browser 24 to perform a desired motion task as schematically indicated at 28 in FIG. 1.

Content providers may provide non-motion data such as one or more of audio, video, Shockwave or Flash animated graphics, and various other types of data. In a preferred embodiment, the control software system 20 is capable of merging motion data with such non-motion data to obtain a special form of motion media; in particular, motion media that includes non-motion data will be referred to herein as enhanced motion media.

The present invention is of particular significance when the motion media is generated from the motion program using a hardware independent model such as that disclosed in U.S. Pat. Nos. 5,691,897 and 5,867,385 issued to the present Applicant, and the disclosure in these patents is incorporated herein by reference. However, the present invention also has application when the motion media is generated, in a conventional manner, from a motion program specifically written for a particular hardware device.

As will be described in further detail below, the control software system 20 performs one or more of the following functions. The control software system 20 initiates a data connection between the control software system 20 and the client browser 24. The control software system 20 also creates motion media based on input, in the form of a motion program, from the content server system 26. The control software system 20 further delivers motion media to the client browser 24 as either dynamic motion media or static motion media. Dynamic motion media is created by the system 20 as and when requested, while static motion media is created and then stored in a persistent storage location for later retrieval.

Referring again to FIG. 1, the exemplary control software system 20 comprises a services manager 30, a meta engine 32, an interleaving engine 34, a filtering engine 36, and a streaming engine 38. In the exemplary system 20, the motion media is stored at a location 40, motion scripts are stored at a location 42, while rated motion data is stored at a location 44. The storage locations may be one physical device or even one location if only one type of storage is required.

Not all of these components are required in a given control software system constructed in accordance with the present invention. For example, if a given control software system is intended to deliver only motion media and not enhanced motion media, the interleaving engine 34 may be omitted or disabled. Or if the system designer is not concerned with controlling the distribution of motion media based on content rules, the filtering engine 36 and rated motion storage location 44 may be omitted or disabled.

The services manager 30 is a software module that is responsible for coordinating all other modules comprising the control software system 20. The services manager 30 is also the main interface to all clients across the network.

The meta engine 32 is responsible for arranging all motion data, including queries, configuration, and control actions, into discrete motion packets. The meta engine 32 further groups motion packets into motion frames that make up the smallest number of motion packets that must execute together to ensure reliable operation. If reliability is not a concern, each motion frame may contain only one packet of motion data—i.e. one motion instruction. The meta engine 32 still further groups motion frames into motion scripts that make up a sequence of motion operations to be carried out by the target motion system. These motion packets and motion scripts form the motion media described above. The process of forming motion frames and motion scripts is described in more detail in Exhibit 2, which is attached hereto and incorporated herein by reference.

The interleaving engine 34 is responsible for merging motion media, which includes motion frames comprising motion packets, with non-motion data. The merging of motion media with non-motion data is described in further detail in Exhibit 3, which is attached hereto and incorporated by reference.

Motion frames are mixed with other non-motion data either on a time basis, a packet or data size basis, or a packet count basis. When mixing frames of motion with other media on a time basis, motion frames are synchronized with other data so that motion operations appear to occur in sync with the other media. For example, when playing a motion/audio mix, the target motion system may be controlled to move in sync with the audio sounds.

After merging data related to non-motion data (e.g., audio, video, etc) with data related to motion, a new data set is created. As discussed above, this new data set combining motion media with non-motion data will be referred to herein as enhanced motion media.

More specifically, the interleaving engine 34 forms enhanced motion media in one of two ways depending upon the capabilities of the target device at the client browser 22. When requested to use a non-motion format (as the default format) by either a third party content site or even the target device itself, motion frames are injected into the non-motion media. Otherwise, the interleaving engine 34 injects the non-motion media into the motion media as a special motion command of 'raw data' or specifies the non-motion data type (ie 'audio-data', or 'video-data'). By default, the interleaving engine 34 creates enhanced motion media by injecting motion data into non-motion data.

The filtering engine 36 injects rating data into the motion media data sets. The rating data, which is stored at the rating data storage location 44, is preferably injected at the beginning of each script or frame that comprises the motion media. The client browser 22 may contain rating rules and, if desired, filters all received motion media based on these rules to obtain filtered motion media.

In particular, client browser 22 compares the rating data contained in the received motion media with the ratings rules stored at the browser 22. The client browser 22 will accept motion media on a frame by frame or script basis when the ratings data falls within the parameters embodied by the ratings rules. The client browser will reject, wholly or in part, media on a frame by frame or script basis when the ratings data is outside the parameters embodied by the ratings rules.

In another embodiment, the filtering engine 36 may be configured to dynamically filter motion media when broadcasting rated motion data. The modification or suppression of inappropriate motion content in the motion media is thus performed at the filtering engine 36. In particular, the filtering engine 36 either prevents transmission of or downgrades the rating of the transmitted motion media such that the motion media that reaches the client browser 22 matches the rating rules at the browser 22.

Motion media is downgraded by substituting frames that fall within the target system rating rules for frames that do not fall within the target system's rating. The filtering engine 36 thus produces a data set that will be referred to herein as the rated motion media, or rated enhanced motion media if the motion media includes non-motion data.

The streaming engine 38 takes the final data set (whether raw motion scripts, enhanced motion media, rated motion media, or rated enhanced motion media) and transmits this final data set to the client browser 22. In particular, in a live-update session, the final data set is sent in its entirety to the client browser 22 and thus to the target device associated therewith. When streaming the data to the target device, the data set is sent continually to the target device.

Optionally, the target system will buffer data until there is enough data to play ahead of the remaining motion stream received in order to maintain continuous media play. This is optional for the target device may also choose to play each frame as it is received yet network speeds may degrade the ability to play media in a continuous manner. This process may continue until the motion media data set ends, or, when dynamically generated, the motion media may play indefinitely.

One method of implementing the filtering engine 36 is depicted in Exhibit 6 attached hereto. The document attached hereto as Exhibit 6 describes the target and host filtering models and the target key and content type content filtering models.

Figure 2:
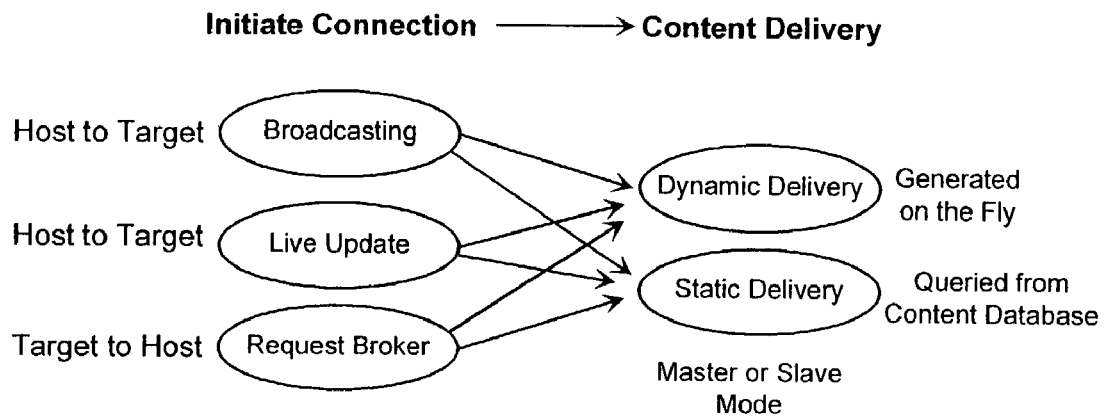
FIG. 2 is a block diagram depicting how the control software system of FIG. 1 can communicate with clients.

Referring now to FIG. 2, depicted therein is a block diagram illustrating the various forms in which data may be communicated among the host system software 20 and the target device at the client browser 22. Before any data can be sent between the host and the target, the network connection between the two must be initiated. There are several ways in which this initiation process takes place. As shown in FIG. 2, this initiation process may be accomplished by broadcasting, live update, and request broker.

In addition, FIG. 2 also shows that, once the connection is initiated between the host and target systems, the content delivery may occur dynamically or via a static pool of already created content. When delivering dynamic content, the content may be sent via requests from a third party content site in a slave mode, where the third party requests motion media from the host on behalf of the target system. Or the dynamic content may be delivered in a master mode where the target system makes direct requests for motion media from the host where the motion services reside.

In the following discussion, the scenario maps depicted in FIGS. 3-8 will be explained in further detail. These scenario maps depict a number of scenarios in which the control software system 20 may operate.

Figure 3:
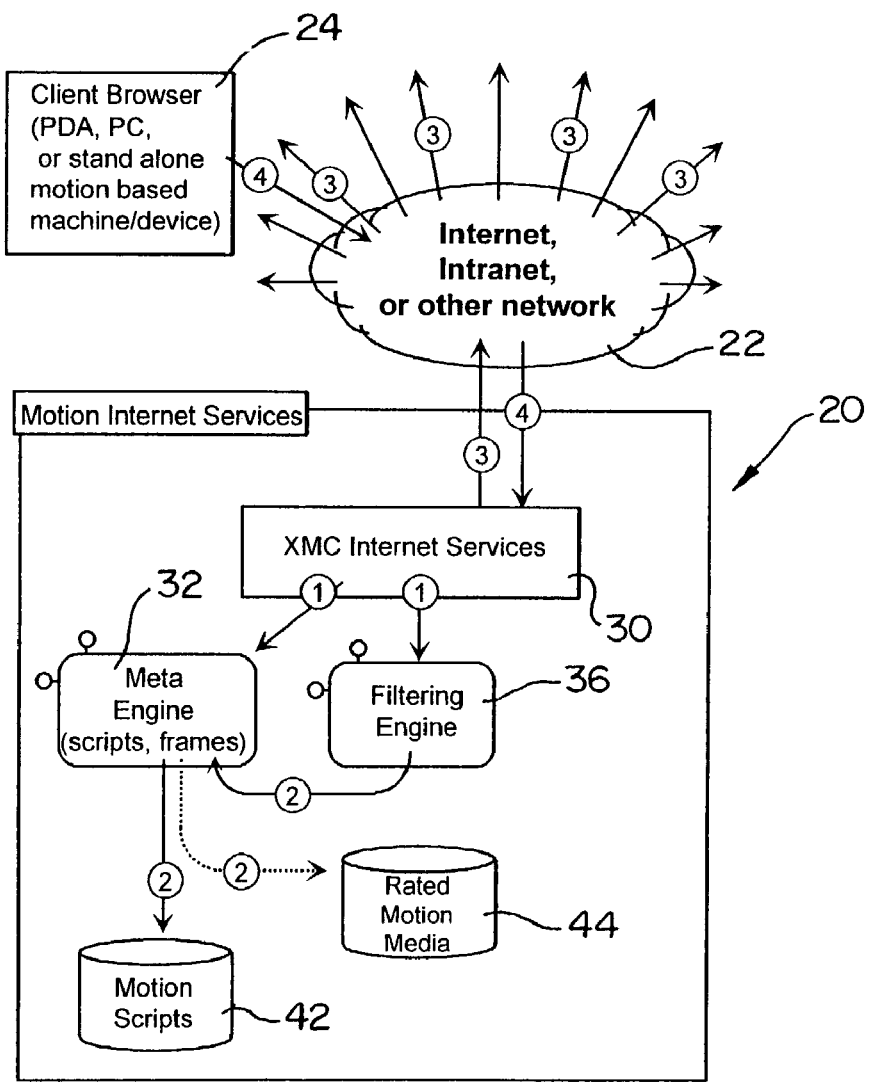
FIGS. 3-8 are module interaction maps depicting how the modules of the motion control system interact under various scenarios.

Referring initially to FIG. 3, depicted therein is a scenario map that describes the broadcasting process in which the host sends information across the network to all targets possible, notifying each that the host is ready to initiate a connection to transmit motion media. Broadcasting consists of initiating a connection with a client by notifying all clients of the host's existence via a connectionless protocol by sending data via the User Diagram Protocol (or UDP). The UDP is a connectionless protocol standard that is part of the standard TCP/IP family of Internet protocols. Once notified that the host has motion media to serve, each target can then respond with an acceptance to complete the connection. The broadcasting process is also disclosed in Exhibits 1 and 4, which are attached hereto and incorporated herein by reference.

The following steps occur when initiating a connection via broadcasting.

First, before broadcasting any data, the services manager 30 queries the meta engine 32 and the filter engine 36 for the content available and its rating information.

Second, when queried, the filter engine 36 gains access to the enhanced or non-enhanced motion media via the meta engine 32. The filtering engine 36 extracts the rating data and serves this up to the internet services manager 30.

Third, a motion media descriptor is built and sent out across the network. The media descriptor may contain data as simple as a list of ratings for the rated media served. Or the descriptor may contain more extensive data such as the type of media categories supported (i.e., medias for two legged and four legged toys available). This information is blindly sent across the network using a connectionless protocol. There is no guarantee that any of the targets will receive the broadcast. As discussed above, rating data is optional and, if not used, only header information is sent to the target.

Fourth, if a target receives the broadcast, the content rating meets the target rating criteria, and the target is open for a connection, the connection is completed when the target sends an acknowledgement message to the host. Upon receiving the acknowledgement message, the connection is made between host and target and the host begins preparing for dynamic or static content delivery.

Figure 4:
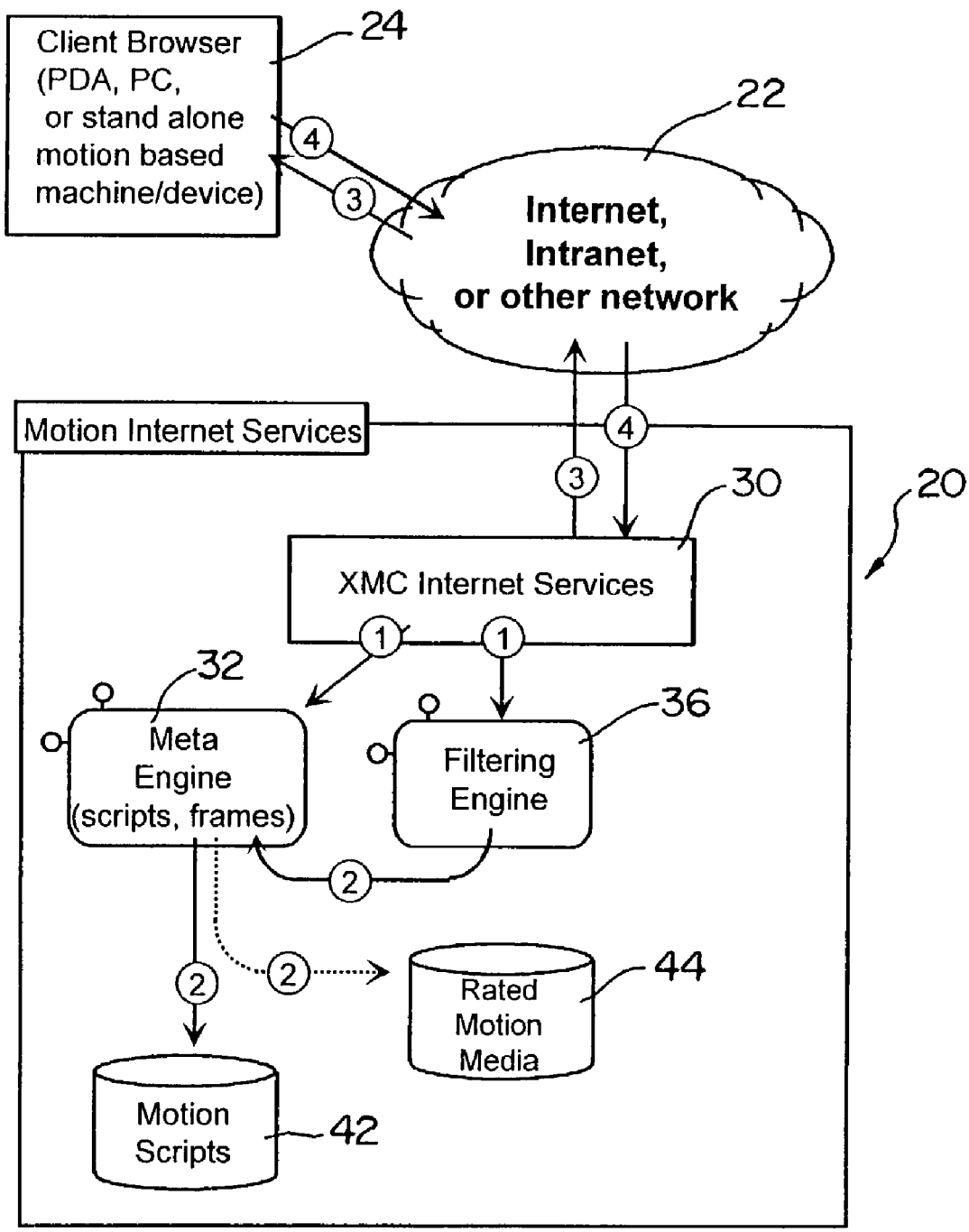

Referring now to FIG. 4, depicted therein is a scenario map illustrating the process of live update connection initiation. A live update connection is a connection based on pre-defined criteria between a host and a target in which the target is previously registered or "known" and the host sends a notification message directly to the known target. The process of live update connection initiation is also disclosed in Exhibit 1 and in Exhibit 5, which is attached hereto and incorporated herein by reference.

The following steps take place when performing a live-update.

First, the internet services manager 30 collects the motion media and rating information. The motion media information collected is based on information previously registered by a known or pre-registered target. For example, say the target registers itself as a two-legged toy—in such a case the host would only collect data on two-legged motion media and ignore all other categories of motion media.

Second, when queried, the filtering engine 36 in turn queries the meta engine 32 for the raw rating information. In addition, the meta engine 32 queries header information on the motion media to be sent via the live update.

Third, the motion media header information along and its associated rating information are sent to the target system. If rating information is not used, only the header information is sent to the target.

Fourth, the target system either accepts or rejects the motion media based on its rating or other circumstances, such as the target system is already busy running motion media.

Figure 5:
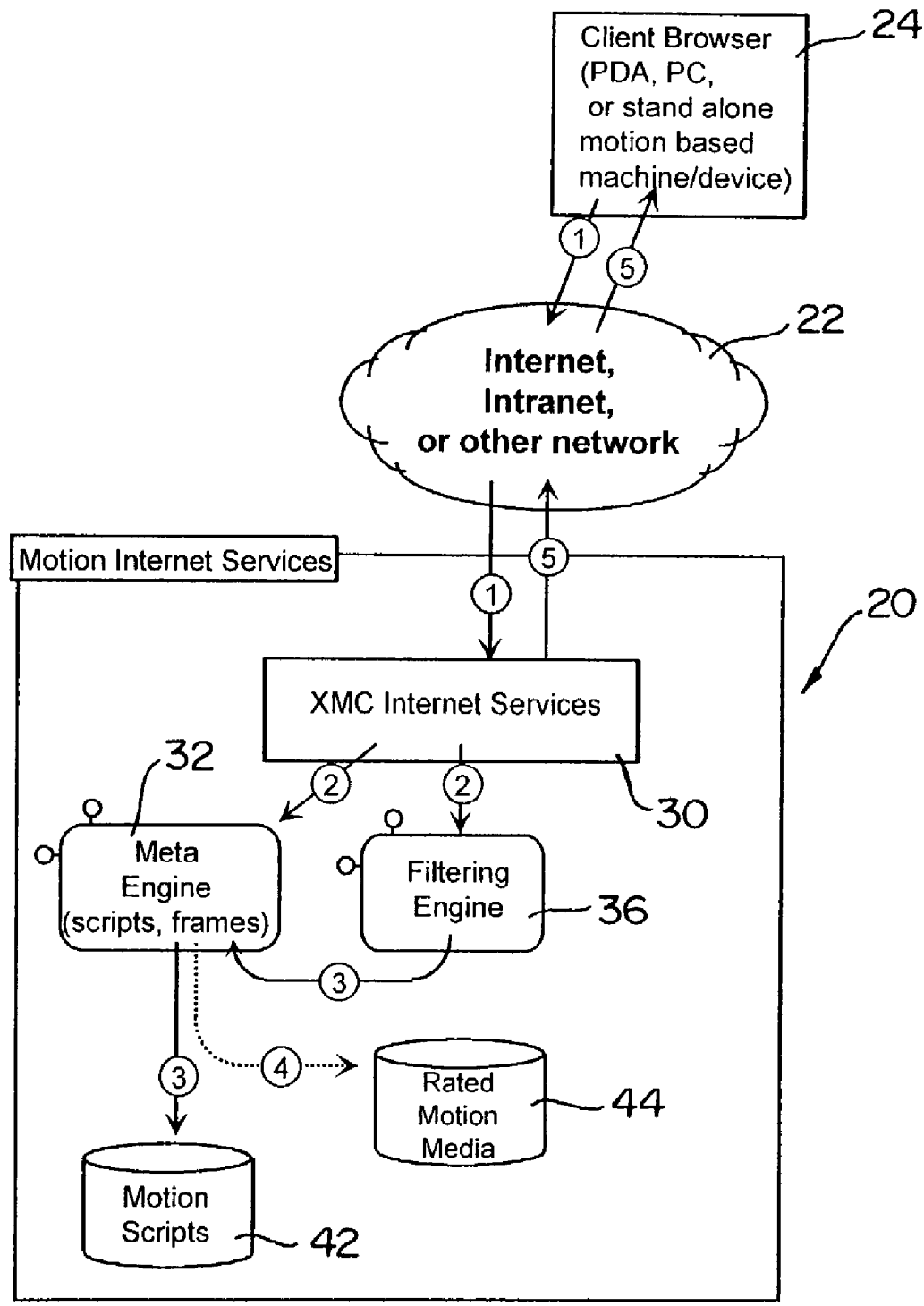

FIG. 5 describes the process of request brokering in master mode in which the target initiates a connection with the host by requesting motion media from the host.

First, to initiate the request broker connection, the target notifies the host that it would like to have a motion media data set delivered. If the target supports content filtering, it also sends the highest rating that it can accept (or the highest that it would like to accept based on the target system's operator input or other parameters) and whether or not to reject or downgrade the media based on the rating.

Second, the services manager 30 queries the meta engine 32 for the requested media and then queries the filter engine 36 to compare the requested rating with that of the content. If the rating does not meet the criteria of the rating rules, the Filter Engine uses the content header downsizing support info to perform Rating Content Downsizing.

Third, the meta engine 32 collects all header information for the requested motion media and returns it to the services manager 30.

Fourth, if ratings are supported, the meta engine 32 also queries all raw rating information from the rated motion media 44. When ratings are used, the rated motion media 44 is used exclusively if available. If the media is already rated, the rated media is sent out. If filtering is not supported on the content server the rating information is ignored and the Raw Motion Scripts or Motion Media data are used.

Fifth, the motion media header information and rating information (if available) are sent back to the requesting target device, which in turn either accepts the connection or rejects it. If accepted, a notice is sent back to the services manager 30 directing it to start preparing for a content delivery session.

Figure 6:
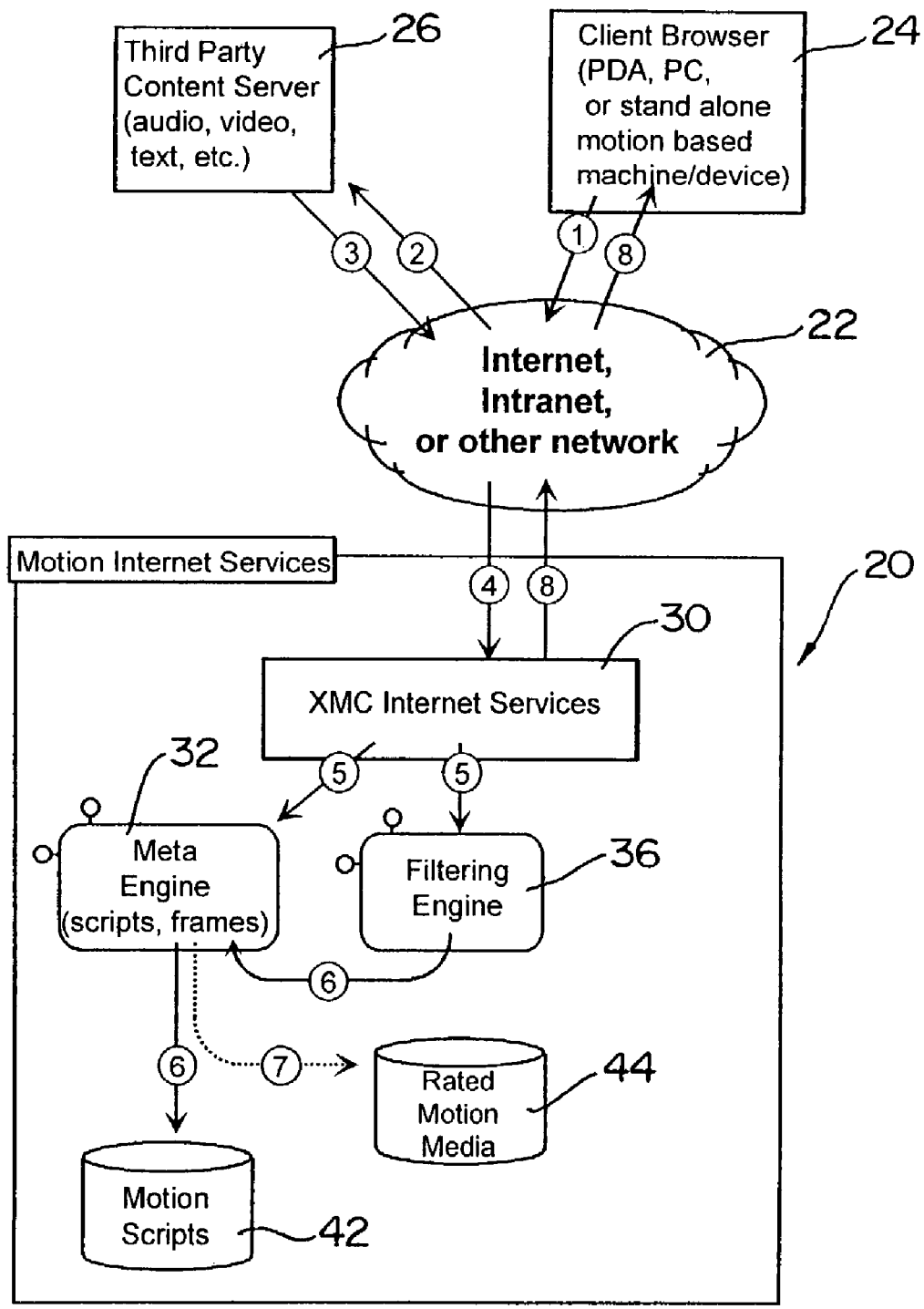

FIG. 6 describes request broker connection initiation in slave mode. In slave mode connection initiation, the target initiates a connection with the third party content server 26, which in turn initiates a connection with the host on behalf of the target system. Request brokering in slave mode is similar to request brokering in master mode, except that the target system communicates directly with a third party content server 26 instead of with the host system.

Slave mode is of particular significance when the third party content site is used to drive the motion content generation. For example, motion media may be generated based on non-motion data generated by the third party content site. A music site may send audio sounds to the host system, which in turn generates motions based on the audio sounds.

The following steps occur when request brokering in slave mode.

First, the target system requests content from the third party content server (e.g., requests a song to play on the toy connected to, or part of the target system).

Second, upon receiving the request, the third party content server locates the song requested.

Third, the third party content server 26 then sends the song name, and possibly the requested associated motion script(s), to the host system 20 where the motion internet service manager 30 resides.

Fourth, upon receiving the content headers from the third party content server 26, the services manager 30 locates the rating information (if any) and requested motion scripts.

Fifth, rating information is sent to the filtering engine 36 to verify that the motion media is appropriate and the requested motion script information is sent to the meta engine 32.

Sixth, the filtering engine 36 extracts the rating information from the requested motion media and compares it against the rating requirements of the target system obtained via the third party content server 26. The meta engine also collects motion media header information.

Seventh, the meta engine 32 extracts rating information from the rated motion media on behalf of the filtering engine 36.

Eighth, either the third party content server is notified, or the target system is notified directly, whether or not the content is available and whether or not it meets the rating requirements of the target. The target either accepts or rejects the connection based on the response. If accepted, the motion internet services begin preparing for content delivery.

Figure 7:
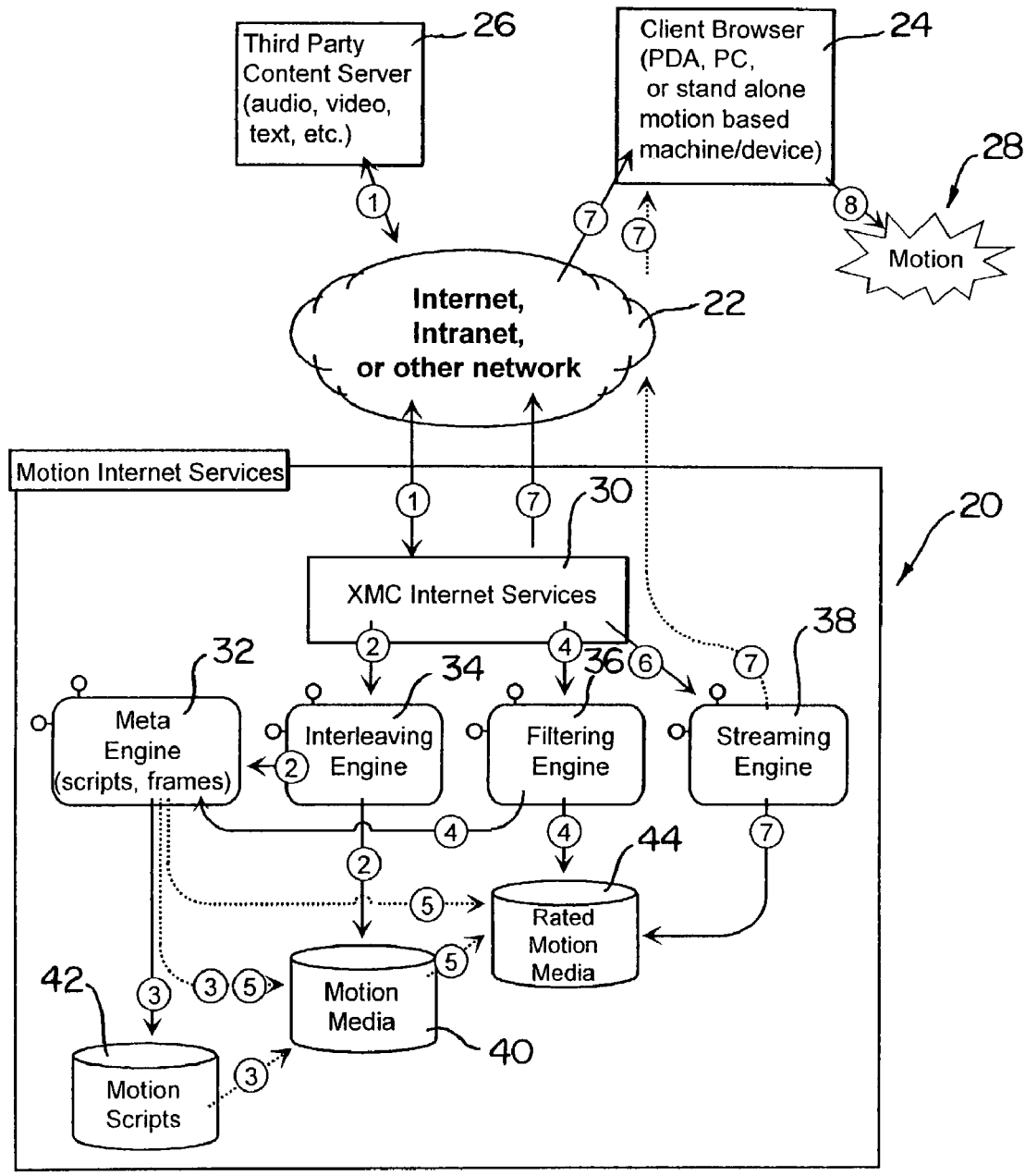

FIG. 7 describes how the host dynamically creates motion media and serves it up to the target system. Once a connection is initiated between host and target, the content delivery begins. Dynamic content delivery involves actually creating the enhanced motion media in real time by mixing motion scripts (either pre-created scripts or dynamically generated scripts) with external media (ie audio, video, etc). In addition, if rating downgrading is requested, the media is adjusted to meet the rating requirements of the target system.

The following steps occur when delivering dynamic content from the host to the target.

In the first step, either content from the third party content server is sent to the host or the host is requested to inject motion media into content managed by the third party content server. The remaining steps are specifically directed to the situation in which content from the third party content server is sent to the host, but the same general logic may be applied to the other situation.

Second, upon receiving the content connection with the third party content server, the services manager 30 directs the interleaving engine 34 to begin mixing the non-motion data (ie audio, video, flash graphics, etc) with the motion scripts.

Third, the interleaving engine 34 uses the meta engine 32 to access the motion scripts. As directed by the interleaving engine 34, the meta engine 32 injects all non-motion data between scripts and/or frames of motion based on the interleaving algorithm (ie time based, data size based or packet count based interleaving) used by the interleaving engine 34. This transforms the motion media data set into the enhanced motion media data set.

Fourth, if ratings are used and downgrading based on the target rating criteria is requested, the filtering engine 36 requests the meta engine 32 to select and replace rejected content based on rating with an equal operation with a lower rating. For example, a less violent move having a lower rating may be substituted for a more violent move having a higher rating. The rated enhanced data set is stored as the rated motion media at the location 44. As discussed above, this step is optional because the service manager 30 may not support content rating.

Fifth, the meta engine 32 generates a final motion media data set as requested by the filtering engine 36.

Sixth, the resulting final motion media data set (containing either enhanced motion media or rated enhanced motion media) is passed to the streaming engine 38. The streaming engine 38 in turn transmits the final data set to the target system.

Seventh, in the case of a small data set, the data may be sent in its entirety before actually played by the target system. For larger data sets (or continually created infinite data sets) the streaming engine sends all data to the target as a data stream.

Eighth, the target buffers all data up to a point where playing the data does not catch up to the buffering of new data, thus allowing the target to continually run motion media.

Figure 8:
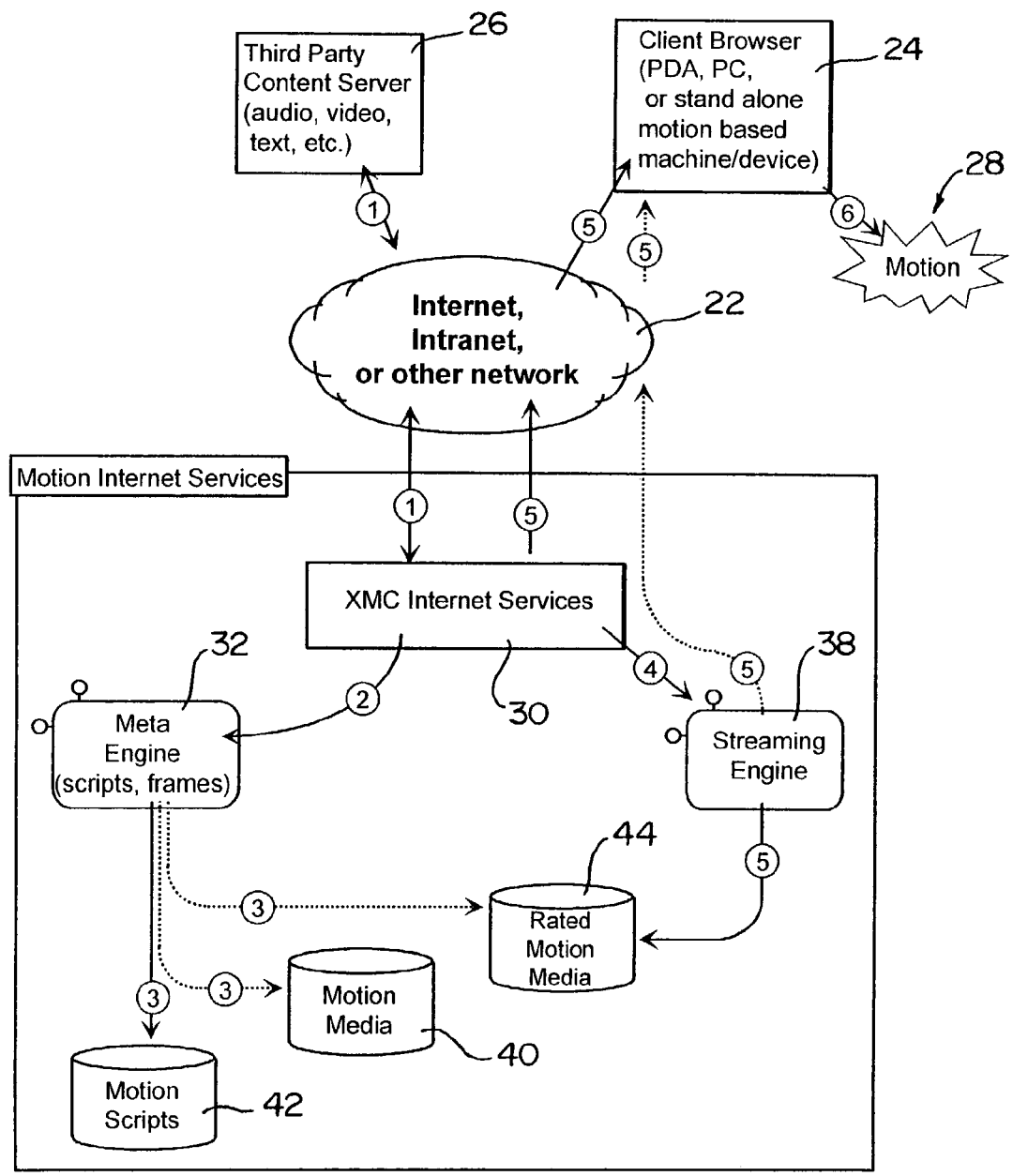

FIG. 8 describes how the host serves up pre-created or static motion media to the target system. Static content delivery is similar to dynamic delivery except that all data is prepared before the request is received from the target. Content is not created on the fly, or in real time, with static content.

The following steps occur when delivering static content from the host to the target.

In the first step, either motion media from the third party content server 26 is sent to the host or the host is requested to retrieve already created motion media. The remaining steps are specifically to the situation in which the host is requested to retrieve already created motion media, but the same general logic may be applied to the other situation.

Second, upon receiving the content connection with the third party content server, the services manager 30 directs the meta engine 32 to retrieve the motion media.

Third, the meta engine 32 retrieves the final motion media data set and returns the location to the services manager 30. Again, the final motion set may include motion scripts, enhanced motion media, rated motion media, or enhanced rated motion media.

Fourth, the final data motion media data set is passed to the streaming engine 38, which in turn feeds the data to the target system.

Fifth, again in the case of a small data set, the data may be sent in its entirety before actually played by the target system. For larger data sets (or continually created infinite data sets) the streaming engine sends all data to the target as a data stream.

Sixth, the target buffers all data up to a point where playing the data does not catch up to the buffering of new data, thus allowing the target to continually run motion media.

The control software system 20 described herein can be used in a wide variety of environments. The following discussion will describe how this system 20 may be used in accordance with several operating models and in several exemplary environments. In particular, the software system 20 may be implemented in the broadcasting model, request brokering model, or the autonomous distribution model. Examples of how each of these models applies in a number of different environments will be set forth below.

The broadcast model, in which a host machine is used to create and store a large collection of data sets that are then deployed out to a set of many target devices that may or may not be listening, may be used in a number of environments. The broadcast model is similar to a radio station that broadcasts data out to a set of radios used to hear the data transmitted by the radio station.

The broadcasting model may be implemented in the several areas of industrial automation. For example, the host machine may be used to generate data sets that are used to control machines on the factory floor. Each data set may be created by the host machine by translating engineering drawings from a known format (such as the data formats supported by AutoCad or other popular CAD packages) into the data sets that are then stored and eventually broadcast to a set of target devices. Each target device may be the same type of machine. Broadcasting data sets to all machines of the same type allows the factory to produce a larger set of products. For example, each target device may be a milling machine. Data sets sent to the group of milling machines would cause each machine to simultaneously manufacture the same part thus producing more than one of the same part simultaneously thus boosting productivity.

Also, industrial automation often involves program distribution, in which data sets are translated from an engineering drawing that is sent to the host machine via an Internet (or other network) link. Once received the host would translate the data into the type of machine run at one of many machine shops selected by the end user. After translation completes, the data set would then be sent across the data link to the target device at the designated machine shop, where the target device may be a milling machine or lathe. Upon receiving the data set, the target device would create the mechanical part by executing the sequence of motions defined by the data set. Once created the machine shop would send the part via mail to the user who originally sent their engineering drawing to the host. This model has the benefit of giving the end user an infinite number of machine shops to choose from to create their drawing. On the other hand, this model also gives the machine shops a very large source of business that sends them data sets tailored specifically for the machines that they run in their shop.

The broadcasting model of the present invention may also be of particular significance during environmental monitoring and sampling. For example, in the environmental market, a large set of target devices may be used in either the monitoring or collection processes related to environmental clean up. In this example, a set of devices may be used to stir a pool of water along different points on a river, where the stirring process may be a key element in improving the data collection at each point. A host machine may generate a data set that is used to both stir the water and then read from a set of sensors in a very precise manner. Once created the data set is broadcast by the host machine to all devices along the river at the same time to make a simultaneous reading from all devices along the river thus giving a more accurate picture in time on what the actual waste levels are in the river.

The broadcasting model may also be of significance in the agriculture industry. For example, a farmer may own five different crop fields that each requires a different farming method. The host machine is used to create each data set specific to the field farmed. Once created, the host machine would broadcast each data set to a target device assigned to each field. Each target device would be configured to only listen to a specific data channel assigned to it. Upon receiving data sets across its assigned data channel, the target device would execute the data set by running each meta command to perform the tilling or other farming methods used to harvest or maintain the field. Target devices in this case may be in the form of standard farming equipment retrofitted with motors, drives, a motion controller, and an software kernel (such as the XMC real-time kernel) used to control each by executing each meta command. The farming operations that may be implemented using the principles of the present invention include watering, inspecting crops, fertilizing crops and/or harvesting crops.

The broadcasting model may also be used in the retail sales industry. For example, the target devices may be a set of mannequins that are employ simple motors, drives, a motion controller, and a software kernel used to run meta commands. The host machine may create data sets (or use ones that have already been created) that are synchronized with music selections that are about to play in the area of the target mannequins. The host machine is then used to broadcast the data sets in a manner that will allow the target device to dance (or move) in a manner that is in sync with the music playing thus giving the illusion that the target device is dancing to the music. This example is useful for the retailer for this form of entertainment attracts attention toward the mannequin and eventually the clothes that it wears. The host machine may send data sets to the target mannequin either over a hard wire network (such as Ethernet), across a wireless link, or some other data link. Wireless links would allow the mannequins to receive updates while still maintaining easy relocation.

The broadcasting model may also be used in the entertainment industry. One example is to use the present invention as part of a biofeedback system. The target devices may be in the form of a person, animal or even a normally inanimate object. The host machine may create data sets in a manner that creates a feedback loop. For example a band may be playing music that the host machine detects and translates into a sequence of coordinated meta commands that make up a stream (or live update) of data. The data stream would then be broadcast to a set of target devices that would in-turn move in rhythm to the music. Other forms of input that may be used to generate sequences of meta commands may be some of the following: music from a standard sound system; heat detected from a group of people (such as a group of people dancing on a dance floor); and/or the level of noise generated from a group of people (such as an audience listening to a rock band).

The broadcasting model may also have direct application to consumers. In particular, the present invention may form part of a security system. The target device may be something as simple as a set of home furniture that has been retrofitted with a set of small motion system that is capable of running meta commands. The host machine would be used to detect external events that are construed to be compromising of the residence security. When detected motion sequences would be generated and transmitted to the target furniture, thus giving the intruder the impression that the residence is occupied thus reducing the chance of theft. Another target device may be a set of curtains. Adding a sequence of motion that mimic that of a person repeatedly pulling on a line to draw the curtains could give the illusion that a person was occupying the residence.

The broadcasting model may also be applied to toys and games. For example, the target device may be in the form of an action figures (such as GI Joe, Barbie and/or Start Wars figures). The host machine in this case would be used to generate sequences of motion that are sent to each target device and then played by the end user of the toy. Since the data sets can be hardware independent, a particular data set may work with a wide range of toys built by many different manufacturers. For example, GI Joe may be build with hardware that implements motion in a manner that is very different from the way that Barbie implements or uses motion hardware. Using the motion kernel to translate all data from hardware independent meta commands to hardware specific logic use to control each motor, both toys could run off the same data set. Combining this model with the live updates and streaming technology each toy could receive and run the same data set from a centralized host.

The request brokering model also allows the present invention to be employed in a number of environments. Request brokering is the process of the target device requesting data sets from the host who in turn performs a live update or streaming of the data requested to the target device.

Request brokering may also be applied to industrial automation. For example, the present invention implemented using the request brokering model may be used to perform interactive maintenance. In this case, the target device may be a lathe, milling machine, or custom device using motion on the factory floor. When running data sets already broadcast to the device, the target device may be configured to detect situations that may eventually cause mechanical breakdown of internal parts or burnout of electronic parts such as motors. When such situations are detected, the target device may request for the host to update the device with a different data set that does not stress the parts as much as those currently being executed. Such a model could improve the lifetime of each target device on the factory floor.

Another example of the request brokering model in the industrial automation environment is to the material flow process. The target device in this example may be a custom device using motion on the factory floor to move different types of materials into a complicated process performed by the device that also uses motion. Upon detecting the type of material the target device may optionally request a new live update or streaming of data that performs the operations special to the specific type of material. Once requested, the host would transmit the new data set to the device that would in turn execute the new meta commands thus processing the material properly. This model would extend the usability of each target device for each could be used on more than one type of material and/or part and/or process.

The request brokering model may also be applied to the retail industry. In one example, the target device would be a mannequin or other target device use to display or draw attention to wares sold by a retailer. Using a sensor to detect location within a building or other space (i.e. a global positioning system), the target device could detect when it is moved from location to location. Based on the location of the device, it would request for data sets that pertain to its current location by sending a data request to the host pertaining to the current location. The host machine would then transmit the data requested. Upon receiving the new data, the device would execute it and appear to be location aware by changing its behavior according to its location.

The request brokering model may also be applied to toys and games or entertainment industry. Toys and entertainment devices may also be made location aware. Other devices may be similar to toys or even a blend between a toy and a mannequin but used in a more adult setting where the device interacts with adults in a manner based on the device's location. Also biofeedback aware toys and entertainment devices may detect the tone of voice used or sense the amount of pressure applied to the toy by the user and then use this information to request a new data set (or group of data sets) to alter its behavior thus appearing situation aware. Entertainment devices may be similar to toys or even mannequins but used in a manner to interact with adults based on biofeedback, noise, music, etc.

The autonomous distribution model may also be applied to a number of environments. The autonomous distribution model is where each device performs both host and target device tasks. Each device can create, store and transmit data like a host machine yet also receive and execute data like a target device.

In industrial automation, the autonomous distribution model may be implemented to divide and conquer a problem. In this application, a set of devices is initially configured with data sets specific to different areas making up the overall solution of the problem. The host machine would assign each device a specific data channel and perform the initial setup across it. Once configured with its initial data sets, each device would begin performing their portion of the overall solution. Using situation aware technologies such as location detection and other sensor input, each target device would collaborate with one another where their solution spaces cross or otherwise overlap. Each device would not only execute its initial data set but also learn from its current situation (location, progress, etc) and generate new data sets that may either apply to itself or transmitted to other devices to run.

In addition, based on the devices situation, the device may request new data sets from other devices in its vicinity in a manner that helps each device collaborate and learn from one another. For example, in an auto plant there may be one device that is used to weld the doors on a car and another device used to install the windows. Once the welding device completes welding it may transmit a small data set to the window installer device thus directing it to start installing the windows. At this point the welding device may start welding a door on a new car.

The autonomous distribution model may also be applied to environmental monitor and control systems. For example, in the context of flow management, each device may be a waste detection device that as a set are deployed at various points along a river. In this example, an up-stream device may detect a certain level of waste that prompts it to create and transmit a data set to a down-stream device thus preparing it for any special operations that need to take place when the new waste stream passes by. For example, a certain type of waste may be difficult to detect and must use a high precision and complex procedure for full detection. An upstream device may detect small traces of the waste type using a less precise method of detection that may be more appropriate for general detection. Once detecting the waste trace, the upstream device would transmit a data set directing the downstream device to change to its more precise detection method for the waste type.

In agriculture, the autonomous distribution model has a number of uses. In one example, the device may be an existing piece of farm equipment used to detect the quality of a certain crop. During detection, the device may detect that the crop needs more water or more fertilizer in a certain area of the field. Upon making this detection, the device may create a new data set for the area that directs another device (the device used for watering or fertilization) to change it's watering and/or fertilization method. Once created the new data set would be transmitted to the target device.

The autonomous distribution model may also be applied to the retail sales environments. Again, a dancing mannequin may be incorporated into the system of the present invention. As the mannequin dances, it may send data requests from mannequins in its area and alter its own meta commands sets so that it dances in better sync with the other mannequins.

Toys and games can also be used with the autonomous distribution model. Toys may work as groups by coordinating their actions with one another. For example, several Barbie dolls may interact with one another in a manner where they dance in sequence or play house.

The following discussion describes several applications that make use of the various technologies disclosed above. In particular, the following examples implement one or more of the following technologies: content type, content options, delivery options, distribution models, and player technologies.

Content type used defines whether the set of data packets are made up of a script of packets consisting of a finite set of packets that are played from start to finish or a stream of packets that are sent to the end device (the player) as a continuous stream of data.

Content options are used to alter the content for special functions that are desired on the end player. For example, content options may be used to interleave motion data packets with other media data packets such as audio, video or analysis data. Other options may be inserted directly into each data packet or added to a stream or script as an additional option data packet. For example, synchronization packets may be inserted into the content directing the player device to synchronize with the content source or even another player device. Other options may be used to define the content type and filtering rules used to allow/disallow playing the content for certain audiences where the content is appropriate.

Delivery options define how the content is sent to the target player device. For example, the user may opt to immediately download the data from an Internet web site (or other network) community for immediate play, or they may choose to schedule a download to their player for immediate play, or they may choose to schedule a download and then schedule a playtime when the data is to be played.

Distribution models define how the data is sent to the end player device that includes how the initial data connection is made. For example, the data source might broadcast the data much in the same way a radio station broadcasts its audio data out to an unknown number of radios that play the data, or the end player device may request the data source to download data in an live-update fashion, or a device may act as a content source and broadcast or serve live requests from other devices.

Player technologies define the technologies used by the player to run and make use of the content data to cause events and actions inside and around the device thus interacting with other devices or the end user. For example, each player may use hardware independent motion or hardware dependent motion to cause movement of arms, legs, or any other type of extrusion on the device. Optionally, the device may use language driver and/or register-map technology in the hardware dependent drivers that it uses in its hardware independent model. In addition, the device may exercise a secure-API technology that only allows the device to perform certain actions within certain user defined (or even device defined) set of boundaries. The player may also support interleaved content data (such as motion and audio) where each content type is played by a subsystem on the device. The device may also support content filtering and/or synchronization.

Referring now to FIG. 8, depicted therein is a diagram illustrating one exemplary configuration for distributing motion data over a computer network such as the World Wide Web. The configuration illustrated in FIG. 8 depicts an interactive application in which the user selects from a set of pre-generated (or generated on the fly) content data sets provided by the content provider on an Internet web site (or other network server).

Users select content from a web site community of users where users collaborate, discuss, and/or trade or sell content. A community is not required, for content may alternatively be selected from a general content listing. Both scripts and streams of content may be selected by the user and immediately downloaded or scheduled to be used at a later point in time by the target player device.

The user may opt to select from several content options that alter the content by mixing it with other content media and/or adding special attribute information that determines how the content is played. For example, the user may choose to mix motion content with audio content, specify to synchronize the content with other players, and/or select the filter criteria for the content that is appropriate for the audience for which it is to be played.

Next, if the content site provides the option, the user may be required to select the delivery method to use when channeling the content to the end device. For example, the user may 'tune' into a content broadcast stream where the content options are merged into the content in a live manner as it is broadcast. Or in a more direct use scenario, the user may opt to grab the content as a live update, where the content is sent directly from the data source to the player. A particular content may not give the delivery method as an option and instead provide only one delivery method.

Once on the player, the user may optionally schedule the content play start time. If not scheduled, the data is played immediately. For data that is interleaved, synchronized, or filtered the player performs each of these operations when playing the content. If the instructions within the content data are hardware independent (i.e. velocity and point data) then a hardware independent software model must be employed while playing the data, which can involve the use of a language driver and/or register-map to generify the actual hardware platform.

The device may employ a security mechanism that defines how certain features on the device may be used. For example, if swinging an arm on the toy is not to be allowed or the speed of the arm swing is to be bound to a pre-determined velocity range on a certain toy, the secure api would be setup to disallow such operations.

The following are specific examples of the interactive use model described above.

The first example is that of a moon-walking dog. The moonwalk dance is either a content script or a continuous stream of motion (and optionally audio) that when played on a robotic dog causes the toy dog to move in a manner where it appears to dance "The Moonwalk". When run with audio, the dog dances to the music played and may even bark or make scratching sounds as it moves its legs, wags its tail and swings its head to the music.

To get the moonwalk dance data, the user must first go the content site (presumably the web site of the toy manufacturer). At the content site, the user is presented with a choice of data types (i.e. a dance script that can be played over and over while disconnected to the content site, or a content stream that is sent to the toy and played as it is received).

A moon-walk stream may contain slight variations of the moon-walk dance that change periodically as the stream is played thus giving the toy dog a more life-like appearance—for its dance would not appear exact and would not repeat itself. Downloading and running a moon-walk script on the other hand would cause the toy dog to always play the exact same dance every time that it was run.

Next, the user optionally selects the content options used to control how the content is to be played. For example, the user may choose to mix the content for the moon-walk dance 'moves' with the content containing a certain song. When played, the user sees and hears the dog dance. The user may also configure the toy dog to only play the G-rated versions of the dance so that a child could only download and run those versions and not run dances that were more adult in nature. If the user purchased the moonwalk dance, a required copyright protection key is inserted into the data stream or script at that time. When playing the moonwalk dance, the toy dog first verifies the key making sure that the data indeed has been purchased. This verification is performed on the toy dog using the security key filtering.

If available as an option, the user may select the method of delivery to be used to send data to the device. For example, when using a stream, the user may 'tune' into a moonwalk data stream that is already broadcasting using a multi-cast mechanism across the web, or the user may simply connect to a stream that contains the moonwalk dance. To run a moonwalk script, the user performs a live-update to download the script onto the toy dog. The content site can optionally force one delivery method or another merely by what it exposes to the user.

Depending on the level of sophistication of hardware and software in the toy dog, certain content options may be used or ignored. If such support does not exist on the dog, it is ignored. For example, if the dog does not support audio, only motion moves are be played and all audio data are ignored. If audio and motion are both supported, the embedded software on the dog separates the data as needed and plays each data type in sequence thus giving the appearance that both were running at the same time and in sync with one another.

Very sophisticated dogs may run both the audio and motion data using the same or separate modules depending on the implementation of the dog. In addition, depending on the level of hardware sophistication, the toy dog may run each packet immediately as it is received, it may buffer each command and then run as appropriate or store all data received and run at a later scheduled time.

When running data, the dog may be developed using a hardware independent model for running each motion instruction. Hardware independence allows each toy dog to be quickly and easily adapted for use with new hardware such as motors, motion controllers, and motion algorithms. As these components change over time (which they more than likely will as technology in this area advances) the same data will run on all versions of the toy. Optionally the language driver and register-map technologies may be employed in the embedded software used to implement the hardware independent motion. This further generifies the embedded software thus cutting down system development and future maintenance time and costs.

Each dog may also employ the secure-API technology to limit the max/min speed that each leg can swing, thus giving the dog's owner much better control over how it runs content. For example, the dog's owner may set the min and max velocity settings for each leg of the dog to a low speed so that the dog doesn't dance at a very high speed. When downloading a 'fast' moonwalk, the dog clips all velocities to those specified within the boundaries previously set by the user.

In another example, similar to that of the dancing dog, a set of mannequins may be configured to dance to the same data stream. For example, a life size model mannequin of Sonny and another of Cher may be configured to run a set of songs originally developed by the actual performers. Before running, the user configures the data stream to be sent to both mannequins and to synchronize with the server so that each mannequin appears to sing and dance in sync with one another.

Using hardware independent motion technologies, the same content could also run on a set of toy dolls causing the toys to dance in sync with one another and optionally dance in sync with the original two mannequins. This model allows the purchaser to try-before-they-buy each dance sequence from a store site. Hardware independence is a key element that makes this model work at a minimal cost for both toy and mannequin run the same data (in either stream or script form) yet their internal hardware is undoubtedly different. The internals of each device (toy and mannequin) are more than likely manufactured by different companies who use different electronic models.

A more advanced use of live-update and synchronization involves two devices that interact with one another using a sensor such as a motion or light sensor to determine which future scripts to run. For example, two wrestling dolls named Joe are configured to select content consisting of a set of wrestling moves, where each move is constructed as a script of packets that each containing move instructions (and or grunt sounds). While running their respective scripts containing different wrestling moves, each wrestling Joe periodically sends synchronization data packets to the other so that they wrestle in sync with one another.

While performing each wrestling move each Joe also receives input from their respective sensors. Receiving input from each sensor triggers the Joe (who's sensor was triggered) to perform a live-update requesting a new script containing a new wrestling move. Upon receiving the script, it is run thus giving the appearance that the Wrestling Joe has another move up his sleeve.

When downloading content each toy may optionally be programmed at the factory to only support a specific set of moves—the signature moves that pertain to the specific wrestling character. For example a Hulk Hogan doll would only download and run scripts selected from the Hulk Hogan wrestling scripts. Security Key Filtering is employed by the toy to force such a selection. Attempting to download and run other types of scripts (or even streams) fails if the toy is configured in this manner. This type of technology gives the doll a very interactive appearance and allows users to select one toy from another based on the set of wrestling moves that it is able to download from the content site.

Figure 9:
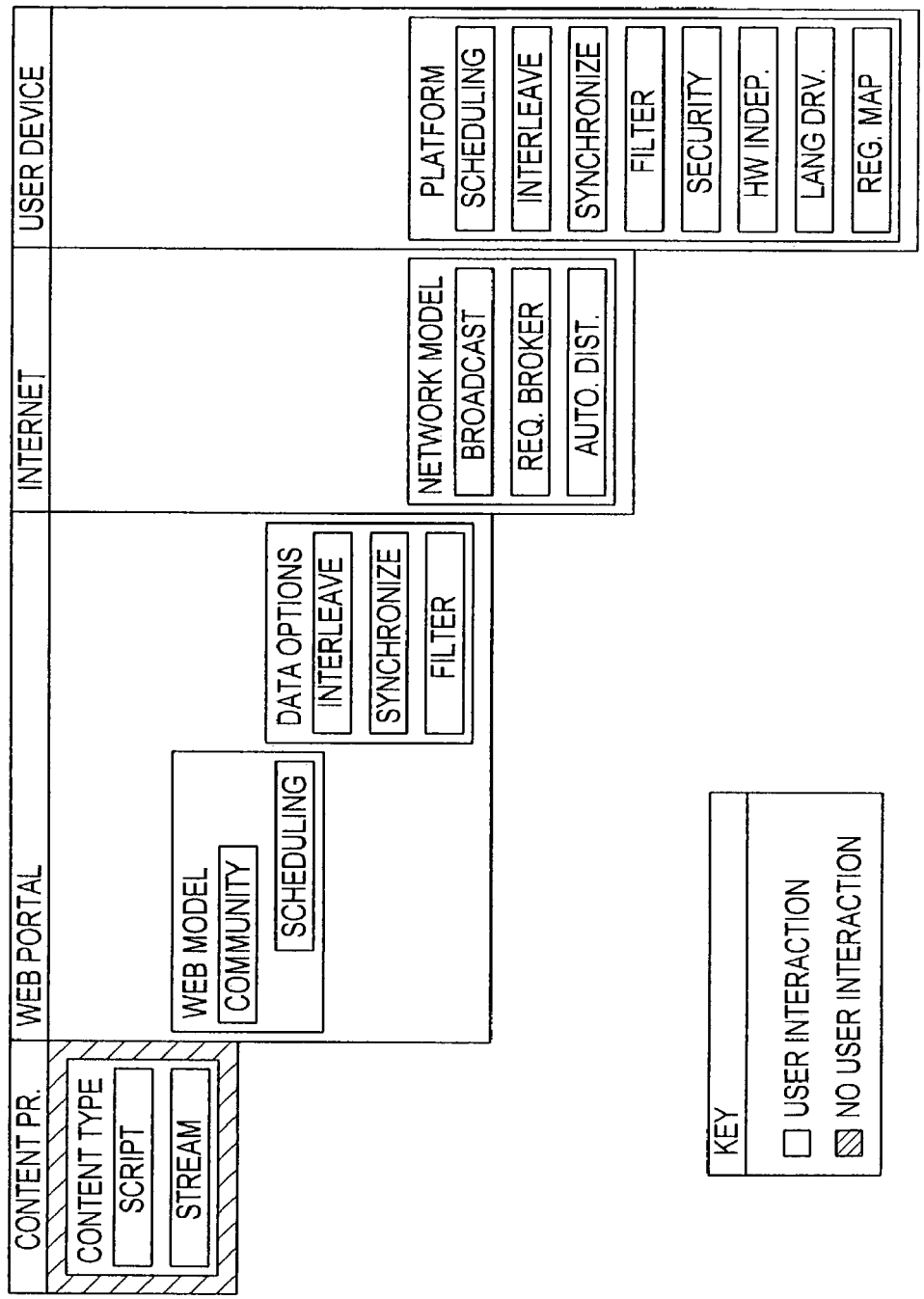
FIGS. 9-12 are diagram depicting separate exemplary implementations of the present invention.

Referring now to FIG. 9, depicted therein is another exemplary configuration for distributing motion data using pre-fabricated applications. Pre-fabricated applications are similar to interactive applications, yet much of the content is pre-generated by the content provider. Unlike the interactive model, where content options are merged into content during the download process, pre-fabricated content has all (or most) options already merged into the data before the download. For example, an interleaved motion/audio data stream is mixed and stored persistently before download thus increasing the download processing time.

In the same light as the Interactive Applications, users still select content from either a community that contains a dynamic content list or a static list sitting on a web site (or other network site). Users may optionally schedule a point in time to download and play the content on their device. For example, a user might log into the content site's schedule calendar and go to the birthday of a friend who owns the same device player. On the specified day, per the scheduled request, the content site downloads any specified content to the target device player and initiates a play session. At the time the data is received the 'listening' device starts running the data, bringing the device to life—probably much to the surprise of its owner. Since pre-fabricated content is already pre-built, it is a natural fit for scheduled update sessions that are to run on devices other than the immediate user's device because there are less options for the device owner to select from.

One example in this context is a birthday jig example that involves a toy character able to run both motion and play audio sounds. With this particular character a set of content streams have been pre-fabricated to cause the particular toy to perform certain gestures while it communicates thus giving the character the appearance of a personality. At the manufacturing site, a security key is embedded into a security data packet along with a general rating for the type of gestures. All motion data is mixed with audio sounds so that each gesture occurs in sync with the specific words spoken to the user. The toy also uses voice recognition to determine when to switch to (download and run) a new pre-fabricated script that relates to the interpreted response.

The toy owner visits the toy manufacture's web site and discovers that several discussions are available for running on their toy. A general rated birthday topic is chose and scheduled by the user. To schedule the content update, the user selects a time, day, month, and year in a calendar program located on the toy manufacture's web site. The conversation script (that includes motion gestures) is selected and specified to run when the event triggers.

On the time, day, month and year that the scheduled event occurs, the conversation content is downloaded to the target toy by the web-site, where the web-site starts a broadcast session with the particular toy's serial number embedded as a security key. Alternatively, when the user schedules the event, the website immediately sends data directly to the toy via a wireless network device that is connected to the Internet (i.e. a TCP/IP enabled Blue-Tooth device) thus programming the toy to 'remember' the time and date of the live-update event.

When the time on the scheduled date arrives either the content site starts broadcasting to the device (making sure to embed a security key into the data so that only the target device is able to play the data) or if the device is already pre-programmed to kick off a live-update, the device starts downloading data immediately from the content site and plays it once received.

Running the content conversation causes the toy to jump to life waving its hands and arms while proclaiming, "congratulations, its your birthday!" and then sings a happy birthday song. Once the song completes, the devices enters into a getting to know you conversation. During the conversation, the device asks a certain question and waits for a response from the user. Upon hearing the response, the device uses voice recognition to map the response into one of many target new response scripts to run. If the new response script is not already downloaded the device triggers another live-update session requesting the new target script from the content site. The new script is run once received or if already downloaded it is run immediately. Running the new script produces a new question along with gesture moves.

Figure 10:
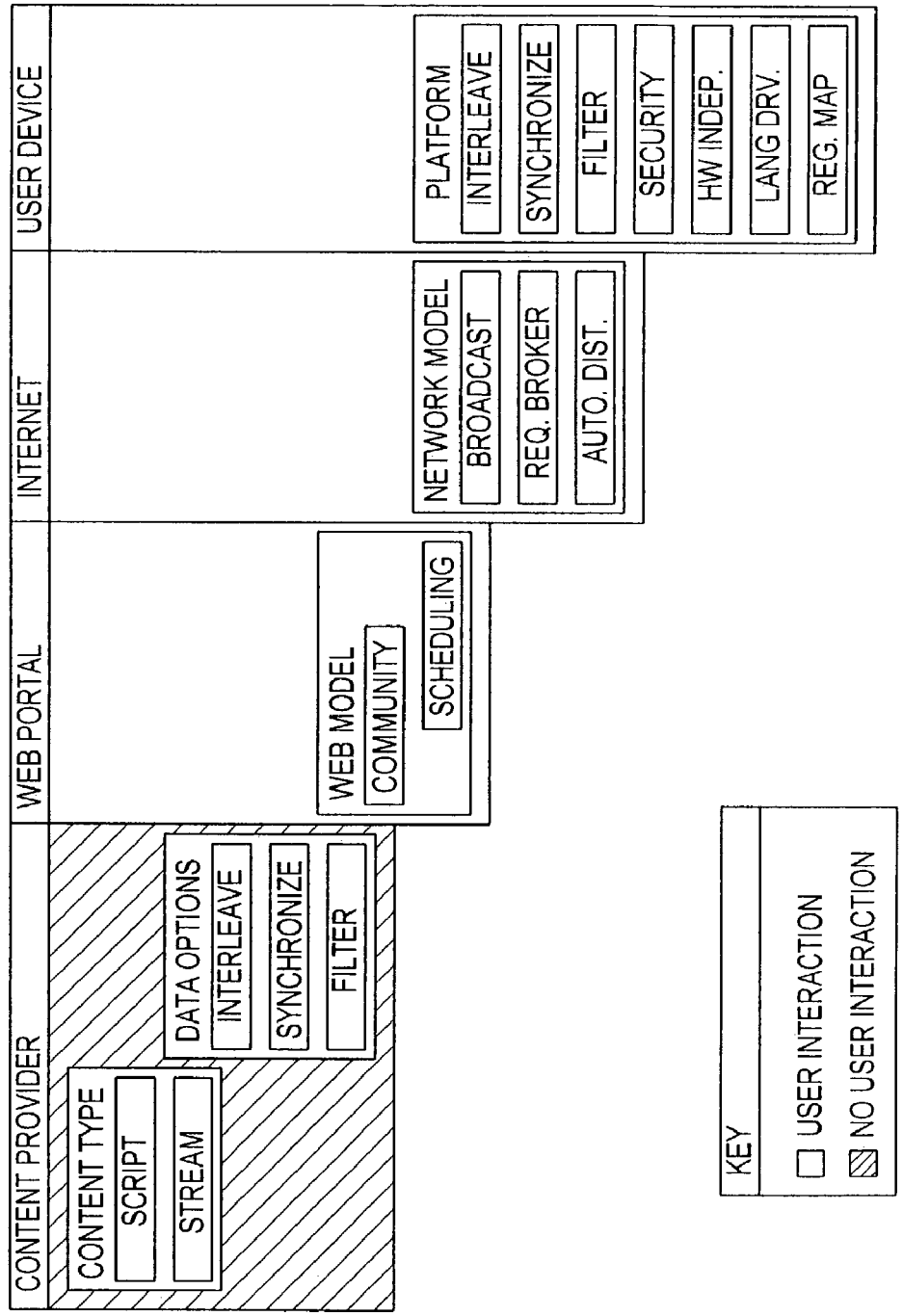
Figure 11:
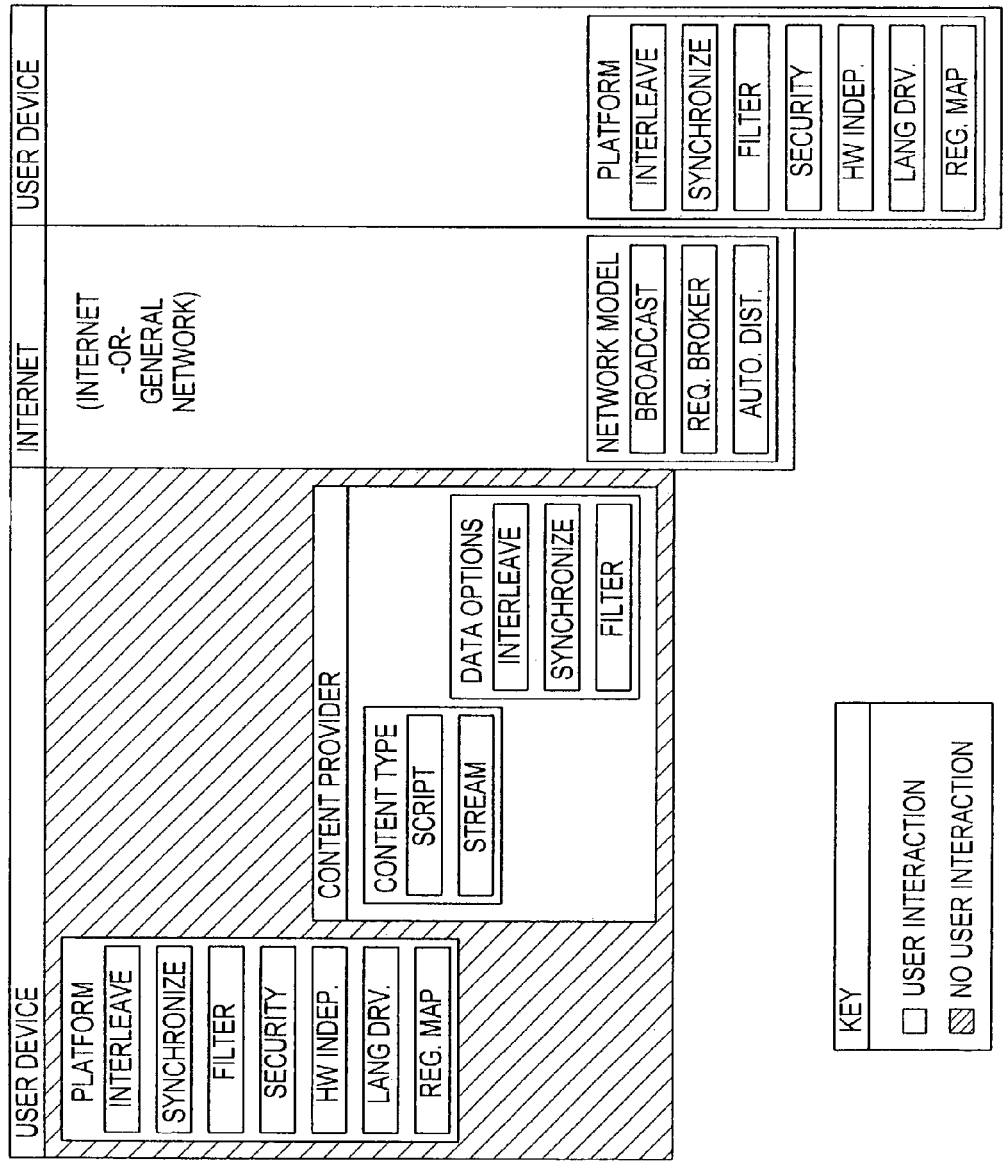

Referring now to FIG. 10, depicted therein is yet another exemplary configuration for distributing motion data over a computer network using what will be referred to as autonomous applications. Autonomous applications involve a similar set of technologies as the interactive applications except that the device itself generates the content and sends it to either a web site (such as a community site) or another device.

The device to web model is similar to the interactive application in reverse. The device generates the motion (and even audio) data by recording its moves or calculating new moves based off its moves or off its existing content data (if any). When generating more rich content motion data is mixed with other media types, such as audio recorded by the device. If programmed to do so, the device also adds synchronization, content filter and security data packets into the data that it generates. Content is then sent whole (as a script) or broadcast continuously (as a stream) to other 'listening' devices. Each listening device can then run the new data thus 'learning' from the original device.

As an example, the owner of a fight character might train in a particular fight move using a joystick to control the character in real-time. While moving the character, the internal embedded software on the device would 'record' each move by storing the position, current velocity and possibly the current acceleration occurring on each of the axes of motion on the character. Once completely recorded, the toy uploads the new content to another toy thus immediately training the other toy.

Figure 12:
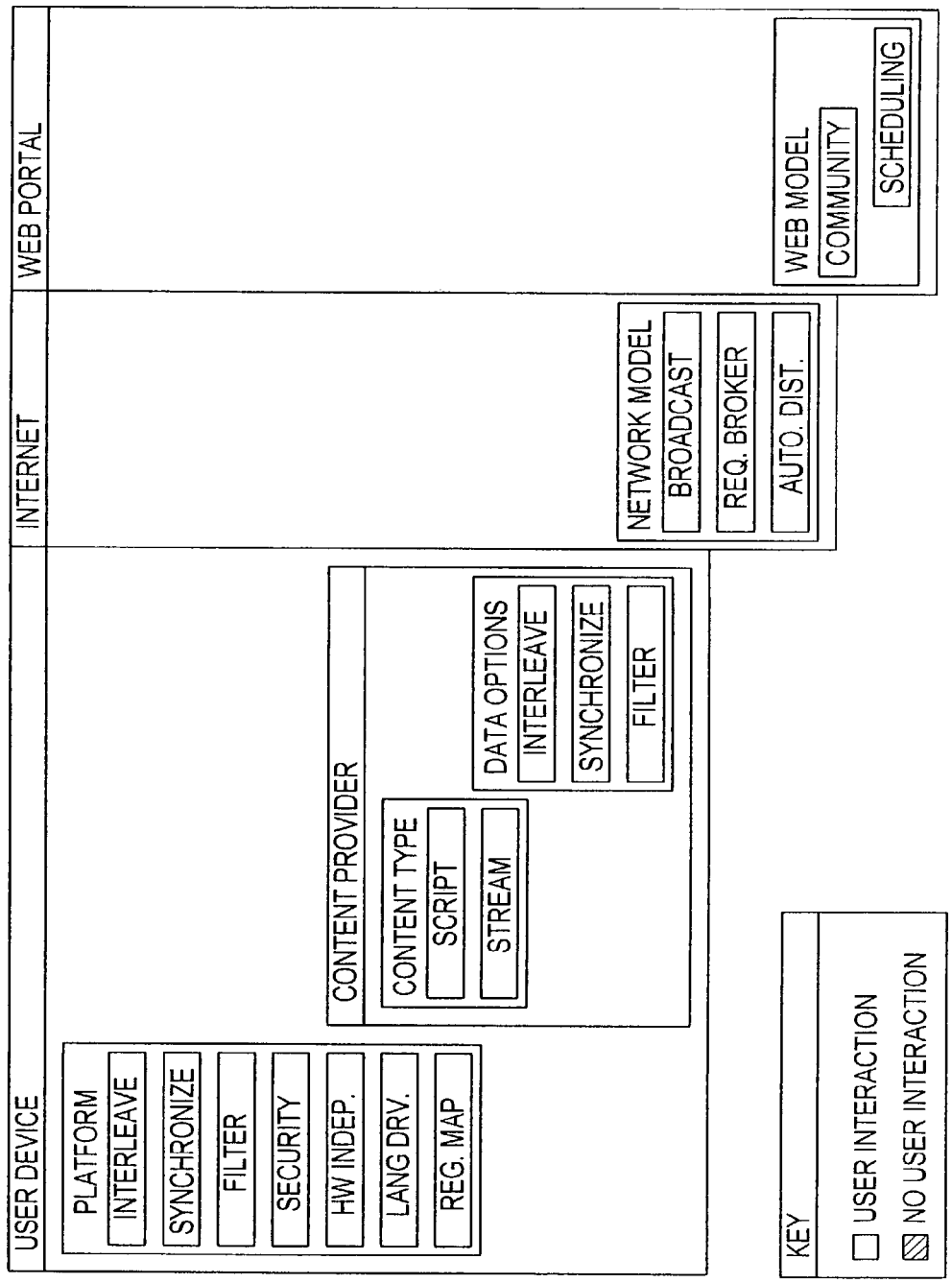

Referring to FIG. 12, the device to web model is graphically represented therein. The device to web model is very similar to the device-to-device model except that the content created by the device is sent to a pre-programmed target web site and stored for use by others. More than likely, the target site is a community site that allows user to share created content.

Using the device-to-web model, a trained toy uploads data to a pre-programmed web site for other's to download and use at a later time.

From the foregoing, it should be clear that the present invention may be embodied in forms other than those described above. The scope of the present invention should thus be determined by the claims ultimately allowed and not the foregoing detailed discussion of the preferred embodiments.

What is claimed is:

1. A method of causing movement of at least one target device based on at least one of a plurality of motion programs stored on a content server connected to a network, where each motion program stored on the content server defines a sequence of movements and the target motion device is capable of operating based on non-motion media, comprising:
    connecting a motion server to the network;
    identifying at least one identified characteristic of the at least one target device;
    selecting at least one selected motion program from the plurality of motion programs stored on the content server;
    transferring the at least one identified characteristic and the at least one selected motion program to the motion server;
    generating at the motion server a motion media data set for the target motion device based on the at least one identified characteristic of the target device and the at least one selected motion program; and
    combining the motion media data set with non-motion media to obtain an enhanced motion media data set;
    establishing rating rules for evaluating rating data;
    forming a rated motion media data set by merging the enhanced motion media data set with rating data, where the rated motion media data set comprises the enhanced motion media data set and rating data;
    transferring a first portion of the rated motion media data set to the target device based on a comparison of the rating data of the rated motion media data set with the rating rules;
    preventing transfer of a second portion of the rated motion media data set to the target device based on the comparison of the rating data of the motion media data set with the rating rules; and
    causing the target motion device to perform at least one of the sequence of movements and non-motion actions based on the first portion of the rated motion media data set transferred to the target device.

2. A method of causing movement of at least one target device based on at least one of a plurality of motion programs stored on a content server connected to a network, where each motion program stored on the content server defines a sequence of movements, comprising:
    connecting a motion server to the network;
    identifying at least one identified characteristic of the at least one target device;
    selecting at least one selected motion program from the plurality of motion programs stored on the content server,
    transferring the at least one identified characteristic and the at least one selected motion program to the motion server;
    generating at the motion server a motion media data set for the target motion device based on the at least one identified characteristic of the target device and the at least one selected motion program;
    establishing rating rules for evaluating rating data;
    forming a rated motion media data set by merging the motion media with rating data, where the rated motion media data set comprises the motion media and rating data;
    transferring a first portion of the rated motion media data set to the target device based on a comparison of the rating data of the rated motion media data set with the rating rules;
    altering a second portion of the rated motion media data set based on the comparison of the rating data of the motion media data set with the rating rules; and
    transferring the second portion of the rated motion media data set to the target motion device;
    causing the target motion device to perform at least one of the sequence of movements and non-motion actions based on the first and second portions of the rated motion media data set transferred to the target device.

3. A method as recited in claim 1, further comprising the step of:
    altering a third portion of the rated motion media data set based on the comparison of the rating data of the motion media data set with the rating rules; and
    transferring the third portion of the rated motion media data set to the target motion device;
    causing the target motion device to perform at least one of the sequence of movements and the non-motion actions based on the first, second, and third portions of the rated motion media data set transferred to the target device.

* * * * *